United States Patent
Akimoto et al.

(10) Patent No.: US 12,118,314 B2
(45) Date of Patent: Oct. 15, 2024

(54) PARAMETER LEARNING APPARATUS, PARAMETER LEARNING METHOD, AND COMPUTER READABLE RECORDING MEDIUM

(71) Applicant: NEC Corporation, Tokyo (JP)

(72) Inventors: Kosuke Akimoto, Tokyo (JP); Takuya Hiraoka, Tokyo (JP); Kunihiko Sadamasa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 395 days.

(21) Appl. No.: 17/614,646

(22) PCT Filed: May 31, 2019

(86) PCT No.: PCT/JP2019/021884
§ 371 (c)(1),
(2) Date: Nov. 29, 2021

(87) PCT Pub. No.: WO2020/240871
PCT Pub. Date: Dec. 3, 2020

(65) Prior Publication Data
US 2022/0222442 A1    Jul. 14, 2022

(51) Int. Cl.
*G06F 40/295* (2020.01)
*G06N 3/044* (2023.01)

(52) U.S. Cl.
CPC ........... *G06F 40/295* (2020.01); *G06N 3/044* (2023.01)

(58) Field of Classification Search
CPC .... G06F 40/295; G06F 16/3344; G06F 40/30; G06N 3/044; G06N 5/041; G06N 3/08
See application file for complete search history.

(56) References Cited

U.S. PATENT DOCUMENTS 9,043,197 B1 * 5/2015 Pasca ................... G06F 40/284
704/10
9,195,647 B1 * 11/2015 Zhang .................. G06F 40/284
(Continued)

FOREIGN PATENT DOCUMENTS

JP    2012-27845 A    2/2012
JP    2018-206263 A    12/2018

OTHER PUBLICATIONS

International Search Report for PCT Application No. PCT/JP2019/021884, malled on Aug. 20, 2019.
(Continued)

*Primary Examiner* — Michael N Opsasnick

(57) ABSTRACT

A parameter learning apparatus 100 extracts one entity in a document and a related text representation as a one-term document fact, outputs a one-term partial predicate fact including only the one entity using a predicate fact that includes entities and a predicate, calculates a first one-term score indicating the degree of establishment of the one-term document fact using a one-term partial predicate feature vector, a one-term text representation feature vector, and a one-term entity feature vector that are calculated from parameters, calculates a second one-term score with respect to a combination of one entity and a predicate or a text representation that is not extracted as the one-term partial predicate fact, updates the parameters such that the first one-term score is higher than the second one-term score, and calculates a score indicating the degree of establishment of the predicate fact and a score indicating the degree of establishment of a combination of entities and a predicate that is not obtained as the predicate fact using these scores.

18 Claims, 14 Drawing Sheets

(56) References Cited

U.S. PATENT DOCUMENTS

| | | | |
|---|---|---|---|
| 11,829,722 B2* | 11/2023 | Akimoto | G06F 16/3346 |
| 2009/0063473 A1* | 3/2009 | Van Den Berg | G06F 16/3344 707/999.005 |
| 2009/0063550 A1* | 3/2009 | Van Den Berg | G06F 16/3344 707/999.102 |
| 2012/0117092 A1* | 5/2012 | Stankiewicz | G06F 16/3329 707/755 |
| 2013/0144874 A1* | 6/2013 | Koperda | G06F 16/24578 707/730 |
| 2015/0052098 A1 | 2/2015 | Kveton et al. | |

OTHER PUBLICATIONS

Riedel, Sebastian, et al. "Relation extraction with matrix factorization and universal schemas." Proceedings of the 2013 Conference of the North American Chapter of the Association for Computational Linguistics: Human Language Technologies. Atlanta, Georgia, Jun. 9-14, 2013, pp. 74-84.

Song, Linfeng, et al. "N-ary Relation Extraction using Graph-State LSTM." Proceedings of the 2018 Conference on Empirical Methods in Natural Language Processing. pp. 2226-2235, Brussels, Belgium, Oct. 31-Nov. 4, 2018.

English translation of Written opinion for PCT Application No. PCT/JP2019/021884, mailed on Aug. 20, 2019.

* cited by examiner

Fig.5

MATRIX X

| | | j=1 | j=2 | j=3 | j=4 | j=5 | j=6 |
|---|---|---|---|---|---|---|---|
| | | TEXT REPRESENTATION 1 | TEXT REPRESENTATION 2 | TEXT REPRESENTATION 3 | CastAs_1 | CastAs_2 | CastAs_3 |
| i=1 | Harison Ford | | | | | | |
| i=2 | Star wars | | | | | | |
| i=3 | Han Solo | | | | | | |

Fig.10

MATRIX Y

|   |   | j=1 | j=2 | j=3 | j=4 | j=5 | j=6 |
|---|---|---|---|---|---|---|---|
|   |   | TEXT REPRESENTATION T_(1,2) | TEXT REPRESENTATION T_(1,3) | ... | CastAs _(1,2) | CastAs _(1,3) | ... |
| i=1 | (H.F., S.W.) | | | | | | |
| i=2 | (H.F., H.S.) | | | | | | |
| i=3 | (S.W., H.S.) | | | | | | |
|   | ... | | | | | | |

PARAMETER LEARNING APPARATUS, PARAMETER LEARNING METHOD, AND COMPUTER READABLE RECORDING MEDIUM

This application is a National Stage Entry of PCT/JP2019/021884 filed on May 31, 2019, the contents of all of which are incorporated herein by reference, in their entirety.

TECHNICAL FIELD

The present invention relates to a parameter learning apparatus and a parameter learning method for learning parameters of a learning model that extracts a predicate relationship from a document, and also to a computer readable recording medium having recorded thereon a program for realizing the apparatus and method.

BACKGROUND ART

Abduction inference means derivation of an appropriate hypothesis from the knowledge (rules) given by a logical formula and from events that have been observed (observed events). Abduction inference is useful in the field of artificial intelligence, especially in a diagnosis system based on artificial intelligence, for example.

Note that in order to increase the precision of inference based on Abduction inference, it is necessary to increase the amount of knowledge that can be used. However, conventionally, the generation of a database of knowledge has been performed by humans. Therefore, for example, in order to automate the generation of a database of knowledge, Non-Patent Document 1 and Non-Patent Document 2 disclose techniques to automatically extract predicate relationships from a large number of documents with use of a model that has been constructed through machine learning in advance.

Specifically, according to the technique disclosed in Non-Patent Document 1, first, a combination of a plurality of entities that co-occur in the same sentence, as well as a text representation for interconnecting these entities, is extracted as pair data from a document. Next, a predicate relationship that is established among the entity combinations of respective pieces of pair data is searched for from a database in which knowledge has been registered in advance.

Furthermore, according to the technique disclosed in Non-Patent Document 1, an i×j matrix is generated by associating the entity combinations of extracted pieces of pair data with respective rows i, and associating the predicate relationships that have been retrieved and the text representations of the pieces of pair data with respective columns j. Then, if a corresponding entity combination is extracted from the element at the $i^{th}$ row and the $j^{th}$ column in the matrix(?), and furthermore, there is a corresponding predicate relationship or text representation, this element is deemed to be "1", and if not, this element is deemed "unknown".

Subsequently, with regard to the element that has been deemed "unknown", the technique disclosed in Non-Patent Document 1 calculates the probability that this element is "1". The probability is calculated by calculating the inner products of parameter vectors of respective arguments of the predicate relationship that corresponds to this element and parameter vectors of entities of the pair data that similarly corresponds to this element, and by further calculating the sum of the inner products.

Then, learning of parameter vectors is performed by a machine learning engine so that the probability of the element that is "1" is higher than the probability of the element that has been deemed "unknown", and a model is constructed. Thereafter, when a plurality of entities which have been included in a specific document and for which the predicate relationship is unknown have been input to a matrix that has been generated using this model, a score indicating a degree of certainty at which a predetermined predicate relationship is established among these plurality of entities is output.

Furthermore, according to the technique disclosed in Non-Patent Document 2 as well, first, a combination of a plurality of entities that co-occur in the same sentences, as well as a text representation for interconnecting these entities, is extracted as pair data from a document, similarly to the technique disclosed in Non-Patent Document 1. Next, a predicate relationship corresponding to the extracted pair data is searched for from a database in which knowledge has been registered in advance.

Note that the technique disclosed in Non-Patent Document 2 subsequently performs syntactic analysis with respect to each document and generates a graph that shows the syntactic relationships among words in the sentences as edges based on the result of the analysis. Then, the entity combination in the extracted pair data is associated with the graph, and if the aforementioned predicate relationship has been retrieved with respect to the entity combination associated with the graph, this predicate relationship is appended to the graph as a label.

Subsequently, according to the technique disclosed in Non-Patent Document 2, a model that calculates vectors with respect to words at respective nodes of the graph is constructed using a neural network called Graph State LSTM. Next, the entity combination associated with the graph is used as a target, vectors are calculated for words in the sentences that respectively correspond to the entities with use of the model constructed earlier, and the calculated vectors are used as vectors of these entities.

Then, with use of the entity combination for which vectors have been calculated and the predicate relationship that has been retrieved in connection with this entity combination, the technique disclosed in Non-Patent Document 2 constructs a classifier that uses entities as inputs and outputs a predicate relationship. When a plurality of entities which are included in a specific document and for which the predicate relationship is unknown have been input to this classifier, a corresponding predicate relationship is output.

LIST OF RELATED ART DOCUMENTS

Non-Patent Document

Non-Patent Document 1: Riedel, Sebastian, et al. "Relation extraction with matrix factorization and universal schemas." Proceedings of the 2013 Conference of the North American Chapter of the Association for Computational Linguistics: Human Language Technologies. 2013

Non-Patent document 2: Song, Linfeng, et al. "N-ary Relation Extraction using Graph-State LSTM." Proceedings of the 2018 Conference on Empirical Methods in Natural Language Processing. 2018.

SUMMARY OF INVENTION

Problems to be Solved by the Invention

However, according to the technique disclosed in Non-Patent Document 1, independent parameter vectors are used respectively for distinguishable text representations. Meanwhile, it is often the case that the frequency at which a certain specific text representation between entities appears in a document decreases with an increase in the number of entities whose relationships are represented in this text representation. Therefore, the technique disclosed in Non-Patent Document 1 has a possibility that, if the number of arguments (entities) of a predicate relationship is three or more, negative effects are exerted on learning due to a decrease in the frequency at which parameter vectors corresponding to a certain specific text representation appears during the learning.

On the other hand, according to the technique disclosed in Non-Patent Document 2, the aforementioned problem does not occur, but when a text representation with no label appended thereto has been used as learning data, this learning data becomes negative example, which brings about the possibility that an appropriate predicate relationship is not output.

An example object is to solve the aforementioned problems, and to provide a parameter learning apparatus, a parameter learning method, and a computer readable recording medium in which a text representation with no label appended thereto can also be used as learning data in the extraction of a predicate relationship from a document, and in addition, parameters for the extraction can be learned so that the performance is not influenced by the number of arguments of a predicate to be output.

Means for Solving the Problems

To achieve the above-stated example object, a first parameter learning apparatus according to an example aspect of the invention includes:
  a document fact extracting unit configured to extract, from a set of entities that are each a string of words, a document in which the entities appear, and information regarding the appearance positions of the entities in the document, a pair of one entity that appears in a predetermined range in the document and a text representation including a string of words that is present in the predetermined range and information indicating the appearance position of the entity in the string of words, as a one-term document fact;
  a partial predicate fact output unit configured to obtain a plurality of entities in a predetermined range and a predicate relating to the entities, as a predicate fact, from a database in which entities and related predicates are registered in advance, and output, for each of the plurality of entities that constitute the predicate fact, a one-term predicate that is defined from the predicate that constitutes the predicate fact and the one entity, as a one-term partial predicate fact, using the obtained predicate fact;
  a one-term vector calculating unit configured to calculate a one-term partial predicate feature vector that represents a feature of the predicate in the one-term partial predicate fact, a one-term text representation feature vector that represents a feature of the text representation in the one-term document fact, and a one-term entity feature vector that represents a feature of the entity in the one-term partial predicate fact or the one-term document fact, using a set parameter;
  a one-term score calculating unit configured to calculate, with respect to the one-term partial predicate fact, a score indicating the degree of establishment of the one-term partial predicate fact, as a first one-term score, using the one-term partial predicate feature vector and the one-term entity feature vector that are calculated from the one-term partial predicate fact, and furthermore, also calculate, with respect to the one-term document fact, a score indicating the degree of establishment of the one-term document fact, as the first one-term score, using the one-term text representation feature vector and the one-term entity feature vector that are calculated from the one-term document fact, and in addition, calculate, with respect to a combination of one entity and a predicate that is not extracted as the one-term partial predicate fact, a score indicating the degree of establishment of the combination, as a second one-term score, and furthermore. also calculate, with respect to a combination of one entity and a text representation that is not extracted as the one-term document fact, a score indicating the degree of establishment of the combination, as the second one-term score;
  a parameter learning unit configured to update the parameters to be used in the one-term vector calculating unit with use of a gradient method such that the first one-term score is higher than the second one-term score; and
  a score combining unit configured to calculate, for each predicate fact, a score indicating the degree of establishment of the predicate fact using the first one-term score and the second one-term score, and calculate, with respect to a combination of a plurality of entities and a predicate related to the entities that is not obtained as the predicate fact, a score indicating the degree of establishment of the combination.

Also, to achieve the above-stated example object, a second parameter learning apparatus according to an example aspect of the invention includes:
  a document fact extracting unit configured to extract, from a set of entities that are each a string of words, a document in which the entities appear, and information regarding the appearance positions of the entities in the document, a pair of two entities that appear in a predetermined range in the document and a text representation including a string of words that is present in the predetermined range and information indicating the appearance positions of the two entities in the string of words, as a two-term document fact;
  a partial predicate fact output unit configured to obtain a plurality of entities in a predetermined range and a predicate relating to the entities, as a predicate fact, from a database in which entities and related predicates are registered in advance, and output, for each combination of two entities that are selected from the plurality of entities that constitute the predicate fact, a two-term predicate that is defined from the predicate that constitutes the predicate fact and the combination of two entities, as a two-term partial predicate fact, using the obtained predicate fact;
  a two-term vector calculating unit configured to calculate a two-term partial predicate feature vector that represents a feature of the predicate in the two-term partial predicate fact, a two-term text representation feature vector that represents a feature of the text representation in the two-term document fact, and a two-term entity combination feature vector that represents a feature of a combination of two entities in the two-term partial predicate fact or the two-term document fact, using a set parameter;

a two-term score calculating unit configured to calculate, with respect to the two-term partial predicate fact, a score indicating the degree of establishment of the two-term partial predicate fact, as a first two-term score, using the two-term partial predicate feature vector and the two-term entity combination feature vector that are calculated from the two-term partial predicate fact, and furthermore, also calculate, with respect to the two-term document fact, a score indicating the degree of establishment of the two-term document fact, as the first two-term score, using the two-term text representation feature vector and the two-term entity combination feature vector that are calculated from the two-term document fact, and in addition, calculate, with respect to a combination of two entities and a predicate that is not extracted as the two-term partial predicate fact, a score indicating the degree of establishment of the combination, as a second two-term score, and furthermore, also calculate, with respect to a combination of two entities and a text representation that is not extracted as the two-term document fact, a score indicating the degree of establishment of the combination, as the second two-term score;

a parameter learning unit configured to update the parameters to be used in the two-term vector calculating unit with use of a gradient method such that the first two-term score is higher than the second two-term score; and a score combining unit configured to calculate, for each predicate fact, a score indicating the degree of establishment of the predicate fact using the first two-term score and the second two-term score, and calculate, with respect to a combination of a plurality of entities and a predicate related to the entities that is not obtained as the predicate fact, a score indicating the degree of establishment of the combination.

Furthermore, to achieve the above-stated example object, a first parameter learning method according to an example aspect of the invention includes:

(a) a step of extracting, from a set of entities that are each a string of words, a document in which the entities appear, and information regarding the appearance positions of the entities in the document, a pair of one entity that appears in a predetermined range in the document and a text representation including a string of words that is present in the predetermined range and information indicating the appearance position of the entity in the string of words, as a one-term document fact;

(b) a step of obtaining a plurality of entities in a predetermined range and a predicate relating to the entities, as a predicate fact, from a database in which entities and related predicates are registered in advance, and outputting, for each of the plurality of entities that constitute the predicate fact, a one-term predicate that is defined from the predicate that constitutes the predicate fact and the one entity, as a one-term partial predicate fact, using the obtained predicate fact;

(c) a step of calculating a one-term partial predicate feature vector that represents a feature of the predicate in the one-term partial predicate fact, a one-term text representation feature vector that represents a feature of the text representation in the one-term document fact, and a one-term entity feature vector that represents a feature of the entity in the one-term partial predicate fact or the one-term document fact, using a set parameter;

(d) a step of calculating, with respect to the one-term partial predicate fact, a score indicating the degree of establishment of the one-term partial predicate fact, as a first one-term score, using the one-term partial predicate feature vector and the one-term entity feature vector that are calculated from the one-term partial predicate fact, and furthermore, also calculating, with respect to the one-term document fact, a score indicating the degree of establishment of the one-term document fact, as the first one-term score, using the one-term text representation feature vector and the one-term entity feature vector that are calculated from the one-term document fact, and in addition, calculating, with respect to a combination of one entity and a predicate that is not extracted as the one-term partial predicate fact, a score indicating the degree of establishment of the combination, as a second one-term score, and furthermore, also calculating, with respect to a combination of one entity and a text representation that is not extracted as the one-term document fact, a score indicating the degree of establishment of the combination, as the second one-term score;

(e) a step of updating the parameters to be used in the (c) step, such that the first one-term score is higher than the second one-term score, with use of a gradient method; and (f) a step of calculating, for each predicate fact, a score indicating the degree of establishment of the predicate fact using the first one-term score and the second one-term score, and calculating, with respect to a combination of a plurality of entities and a predicate related to the entities that is not obtained as the predicate fact, a score indicating the degree of establishment of the combination.

Also, to achieve the above-stated example object, a second parameter learning method according to an example aspect of the invention includes:

(a) a step of extracting, from a set of entities that are each a string of words, a document in which the entities appear, and information regarding the appearance positions of the entities in the document, a pair of two entities that appear in a predetermined range in the document and a text representation including a string of words that is present in the predetermined range and information indicating the appearance positions of the two entities in the string of words, as a two-term document fact;

(b) a step of obtaining a plurality of entities in a predetermined range and a predicate relating to the entities, as a predicate fact, from a database in which entities and related predicates are registered in advance, and outputting, for each combination of two entities that are selected from the plurality of entities that constitute the predicate fact, a two-term predicate that is defined from the predicate that constitutes the predicate fact and the combination of two entities, as a two-term partial predicate fact, using the obtained predicate fact;

(c) a step of calculating a two-term partial predicate feature vector that represents a feature of the predicate in the two-term partial predicate fact, a two-term text representation feature vector that represents a feature of the text representation in the two-term document fact, and a two-term entity combination feature vector that represents a feature of a combination of two entities in the two-term partial predicate fact or the two-term document fact, using a set parameter;

(d) a step of calculating, with respect to the two-term partial predicate fact, a score indicating the degree of establishment of the two-term partial predicate fact, as a first two-term score, using the two-term partial predicate feature vector and the two-term entity combination feature vector that are calculated from the two-term partial predicate fact, and furthermore. also calculating, with respect to the two-term document fact, a score indicating the degree of establishment of the two-term document fact, as the first two-term score, using the two-term text representation feature vector and the two-term entity combination feature vector that are calculated from the two-term document fact, and in addition, calculating, with respect to a combination of two entities and a predicate that is not extracted as the two-term partial predicate fact, a score indicating the degree of establishment of the combination, as a second two-term score, and furthermore, also calculating, with respect to a combination of two entities and a text representation that is not extracted as the two-term document fact, a score indicating the degree of establishment of the combination, as the second two-term score;

(e) a step of updating the parameters to be used in the (c) step such that the first two-term score is higher than the second two-term score, with use of a gradient method; and (f) a step of calculating, for each predicate fact, a score indicating the degree of establishment of the predicate fact using the first two-term score and the second two-term score, and calculating, with respect to a combination of a plurality of entities and a predicate related to the entities that is not obtained as the predicate fact, a score indicating the degree of establishment of the combination.

Furthermore, to achieve the above-stated example object, a first computer readable recording medium that includes a program recorded thereon, the program including instructions that cause a computer to carry out:

(a) a step of extracting, from a set of entities that are each a string of words, a document in which the entities appear, and information regarding the appearance positions of the entities in the document, a pair of one entity that appears in a predetermined range in the document and a text representation including a string of words that is present in the predetermined range and information indicating the appearance position of the entity in the string of words, as a one-term document fact;

(b) a step of obtaining a plurality of entities in a predetermined range and a predicate relating to the entities, as a predicate fact, from a database in which entities and related predicates are registered in advance, and outputting, for each of the plurality of entities that constitute the predicate fact, a one-term predicate that is defined from the predicate that constitutes the predicate fact and the one entity, as a one-term partial predicate fact, using the obtained predicate fact;

(c) a step of calculating a one-term partial predicate feature vector that represents a feature of the predicate in the one-term partial predicate fact, a one-term text representation feature vector that represents a feature of the text representation in the one-term document fact, and a one-term entity feature vector that represents a feature of the entity in the one-term partial predicate fact or the one-term document fact, using a set parameter;

(d) a step of calculating, with respect to the one-term partial predicate fact, a score indicating the degree of establishment of the one-term partial predicate fact, as a first one-term score, using the one-term partial predicate feature vector and the one-term entity feature vector that are calculated from the one-term partial predicate fact, and furthermore, also calculating, with respect to the one-term document fact, a score indicating the degree of establishment of the one-term document fact, as the first one-term score, using the one-term text representation feature vector and the one-term entity feature vector that are calculated from the one-term document fact, and in addition, calculating, with respect to a combination of one entity and a predicate that is not extracted as the one-term partial predicate fact, a score indicating the degree of establishment of the combination, as a second one-term score, and furthermore, also calculating, with respect to a combination of one entity and a text representation that is not extracted as the one-term document fact, a score indicating the degree of establishment of the combination, as the second one-term score;

(e) a step of updating the parameters to be used in the (c) step, such that the first one-term score is higher than the second one-term score, with use of a gradient method; and (f) a step of calculating, for each predicate fact, a score indicating the degree of establishment of the predicate fact using the first one-term score and the second one-term score, and calculating, with respect to a combination of a plurality of entities and a predicate related to the entities that is not obtained as the predicate fact, a score indicating the degree of establishment of the combination.

Furthermore, to achieve the above-stated example object, a second computer readable recording medium that includes recorded a program thereon, the program including instructions that cause a computer to carry out:

(a) a step of extracting, from a set of entities that are each a string of words, a document in which the entities appear, and information regarding the appearance positions of the entities in the document, a pair of two entities that appear in a predetermined range in the document and a text representation including a string of words that is present in the predetermined range and information indicating the appearance positions of the two entities in the string of words, as a two-term document fact;

(b) a step of obtaining a plurality of entities in a predetermined range and a predicate relating to the entities, as a predicate fact, from a database in which entities and related predicates are registered in advance, and outputting, for each combination of two entities that are selected from the plurality of entities that constitute the predicate fact, a two-term predicate that is defined from the predicate that constitutes the predicate fact and the combination of two entities, as a two-term partial predicate fact, using the obtained predicate fact;

(c) a step of calculating a two-term partial predicate feature vector that represents a feature of the predicate in the two-term partial predicate fact, a two-term text representation feature vector that represents a feature of the text representation in the two-term document fact, and a two-term entity combination feature vector that represents a feature of a combination of two entities in the two-term partial predicate fact or the two-term document fact, using a set parameter;

(d) a step of calculating, with respect to the two-term partial predicate fact, a score indicating the degree of establishment of the two-term partial predicate fact, as a first two-term score, using the two-term partial predicate feature vector and the two-term entity combination feature vector that are calculated from the two-term partial predicate fact, and furthermore, also calculating, with respect to the two-term document fact, a score indicating the degree of establishment of the two-term document fact, as the first two-term score, using the two-term text representation feature vector and the two-term entity combination feature vector that are calculated from the two-term document fact, and in addition, calculating, with respect to a combination of two entities and a predicate that is not extracted as the two-term partial predicate fact, a score indicating the degree of establishment of the combination, as a second two-term score, and furthermore, also calculating, with respect to a combination of two entities and a text representation that is not extracted as the two-term document fact, a score indicating the degree of establishment of the combination, as the second two-term score;

(e) a step of updating the parameters to be used in the (c) step such that the first two-term score is higher than the second two-term score, with use of a gradient method; and (f) a step of calculating, for each predicate fact, a score indicating the degree of establishment of the predicate fact using the first two-term score and the second two-term score, and calculating, with respect to a combination of a plurality of entities and a predicate related to the entities that is not obtained as the predicate fact, a score indicating the degree of establishment of the combination.

Advantageous Effects of the Invention

As described above, according to the present invention, a text representation with no label appended thereto can also be used as learning data in the extraction of a predicate relationship from a document, and in addition, parameters for the extraction can be learned so that the performance is not influenced by the number of arguments of a predicate to be output.

BRIEF DESCRIPTION OF THE DRAWINGS

FIG. 5 is a diagram illustrating a score to be calculated in the first example embodiment.

FIG. 10 is a diagram illustrating a score to be calculated in the second example embodiment.

EXAMPLE EMBODIMENT (Premises of Present Invention)

First, in the specification of the present application, an "entity" denotes, for example, an object, a matter, a person, or a concept that appears in an event, and is expressed as a string of words. Examples of the entity include "Obama", "U.S." (proper nouns), "human" (a noun that describes a concept or a type), and so forth.

Also, a "predicate relationship" is defined by a predicate and entities, and categorizes a relationship established among entities based on the meaning of that relationship. One example of the predicate relationship is president (Obama, U.S.). This example indicates that there is a relationship categorized based on "president", which is a predicate relationship meaning that "X is the president of Y", between the entities "Obama" and "U.S.". Furthermore, a predicate relationship that is individually categorized, such as "president", is also referred to as a "predicate". In addition, "Obama" and "U.S." in the aforementioned predicate relationship "president (Obama, U.S.)" are the arguments of the predicate relationship.

In the present example embodiment, "extraction of a predicate relationship" means to extract, from a document, an entity combination that establishes a pre-defined predicate relationship. In the present invention, parameters of a learning model used in this extraction of an entity combination are learned.

For example, assume that there is a document "American Airlines, a unit of AMR, immediately matched the move, spokesman Tim Wagner said". Also assume that the predicate relationships to be extracted are "subsidiary" meaning that "X is a subsidiary of Y", and "employee" meaning that "X is an employee of Y". In this case, with regard to subsidiary, the learning model extracts American Airlines and AMR as an entity combination that establishes a pre-defined predicate relationship. Also, with regard to employee, Tim Wagner and American Airlines are extracted.

Furthermore, although the number of extracted entities (arguments) is two in the aforementioned example, three or more entities can also be extracted by a learning model in which parameters have been learned according to the present invention.

For example, assume that there is a document "Rainbow Sun Francks (born Dec. 3, 1979) is a Canadian actor and singer known for his role as Lt. Aiden Ford in the television show 'Stargate Atlantis'". Furthermore, assume that the predicate relationship to be extracted is "CastAs" meaning that "X (actor) plays Z (character) in Y (movie)". In this case, the learning model extracts Rainbow Sun Francks, Stargate Atlantis, and Lt. Aiden Ford as an entity combination that establishes CastAs.

First Example Embodiment

The following describes a parameter learning apparatus, a parameter learning method, and a program according to a first example embodiment with reference to FIG. 1 to FIG. 6.

[Apparatus Configuration]

Figure 1:
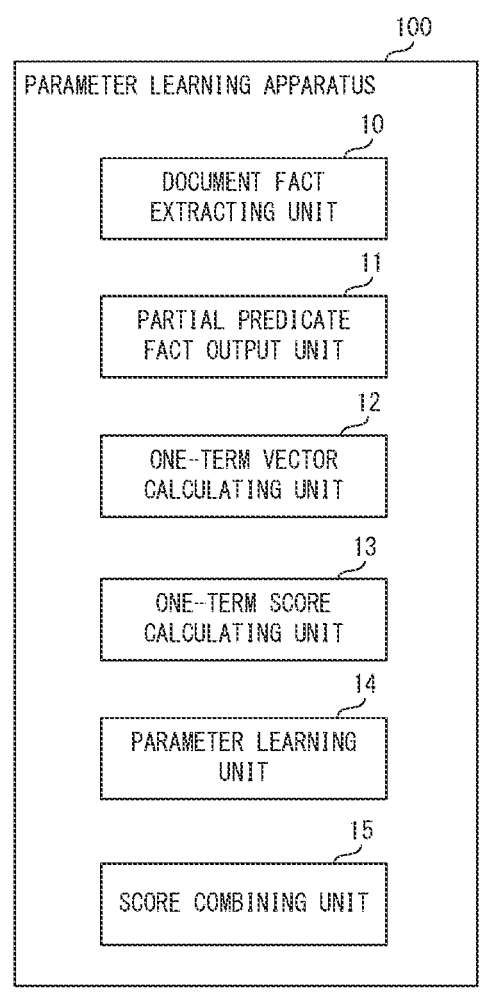
FIG. 1 is a block diagram illustrating a configuration of a parameter learning apparatus according to a first example embodiment.

First, a configuration of the parameter learning apparatus according to the first example embodiment will be described using FIG. 1. FIG. 1 is a block diagram illustrating the configuration of the parameter learning apparatus according to the first example embodiment.

A parameter learning apparatus 100 according to the first example embodiment, which is shown in FIG. 1, performs learning of parameters of a learning model for extracting a predicate relationship from a document. As shown in FIG. 1, the parameter learning apparatus 100 includes a document fact extracting unit 10, a partial predicate fact output unit 11, a one-term vector calculating unit 12, a one-term score calculating unit 13, a parameter learning unit 14, and a score combining unit 15.

The document fact extracting unit 10 extracts a one-term document fact from a set of entities that are each a string of words, a document in which the entities appear, and information regarding the appearance positions of the entities in the document (hereinafter, denoted as "appearance position information"). The one-term document fact is constituted of a pair of one entity that appears in a predetermined range in the document and a text representation. The text representation includes a string of words that is present in the predetermined range, and information indicating the appearance position of the entity in the string of words.

The partial predicate fact output unit 11 obtains a plurality of entities in a predetermined range and a predicate relating thereto from a database in which entities and related predicates are registered in advance (hereinafter, denoted as a "predicate database") as a predicate fact.

Also, the partial predicate fact output unit 11 outputs, for each of the plurality of entities that constitute the predicate fact, the predicate that constitutes the predicate fact and the one entity, as a one-term partial predicate fact, using the obtained predicate fact.

The one-term vector calculating unit 12 calculates a one-term partial predicate feature vector, a one-term text representation feature vector, and a one-term entity feature vector using a set parameter. The one-term partial predicate feature vector is a vector representing the feature of the predicate in a one-term partial predicate fact. The one-term text representation feature vector is a vector representing the feature of the text representation in a one-term document fact. The one-term entity feature vector is a vector representing the feature of the entity in a one-term partial predicate fact or one-term document fact.

The one-term score calculating unit 13 calculates, with respect to a one-term partial predicate fact, a score indicating the degree of establishment of the one-term partial predicate fact, as a first one-term score, using the one-term partial predicate feature vector and the one-term entity feature vector that are calculated from the one-term partial predicate fact. Furthermore, the one-term score calculating unit 13 also calculates, with respect to a one-term document fact, a score indicating the degree of establishment of the one-term document fact, as the first one-term score, using the one-term text representation feature vector and the one-term entity feature vector that are calculated from the one-term document fact.

Also, the one-term score calculating unit 13 calculates, with respect to a combination of one entity and a predicate that are not extracted as the one-term partial predicate fact, a score indicating the degree of establishment of the combination, as a second one-term score. In addition, the one-term score calculating unit 13 also calculates, with respect to a combination of one entity and a text representation that are not extracted as the one-term document fact, a score indicating the degree of establishment of the combination, as the second one-term score.

The parameter learning unit 14 updates the parameters to be used in the one-term vector calculating unit 12 such that the first one-term score is higher than the second one-term score, with use of a gradient method.

The score combining unit 15 calculates, for each predicate fact, a score indicating the degree of establishment of the predicate fact using the first one-term score and the second one-term score. Moreover, the score combining unit 15 calculates, with respect to a combination of a plurality of entities and a predicate related thereto that is not obtained as the predicate fact, a score indicating the degree of establishment of the combination.

As described above, in the present example embodiment, learning of parameters is performed such that a higher score is calculated with respect to a pair, out of pairs of entities and predicates or text representations, that is extracted as the one-term partial predicate fact or the one-term document fact compared to a pair that is not extracted thereas. This, accordingly, achieves an advantageous effect whereby, in a case where a one-term partial predicate fact or a one-term document fact is obtained with a similar entity, there is a similar tendency between the predicate relationship and the text representation in terms of the magnitudes of one-term scores to be calculated. Due to this similarity relationship, a predicate relationship can be predicted even from a text representation to which a label of a predicate relationship has not been directly appended in training data.

Also, the predicate fact is broken down into one-term partial predicate facts, and therefore the number of entities in a combination of entities that co-occur in a document is not limited. Updating of each parameter is performed based on this fact, and therefore, according to the present example embodiment, learning of parameters for extraction can be performed such that the performance is not influenced by the number of arguments of a predicate to be output.

Figure 2:
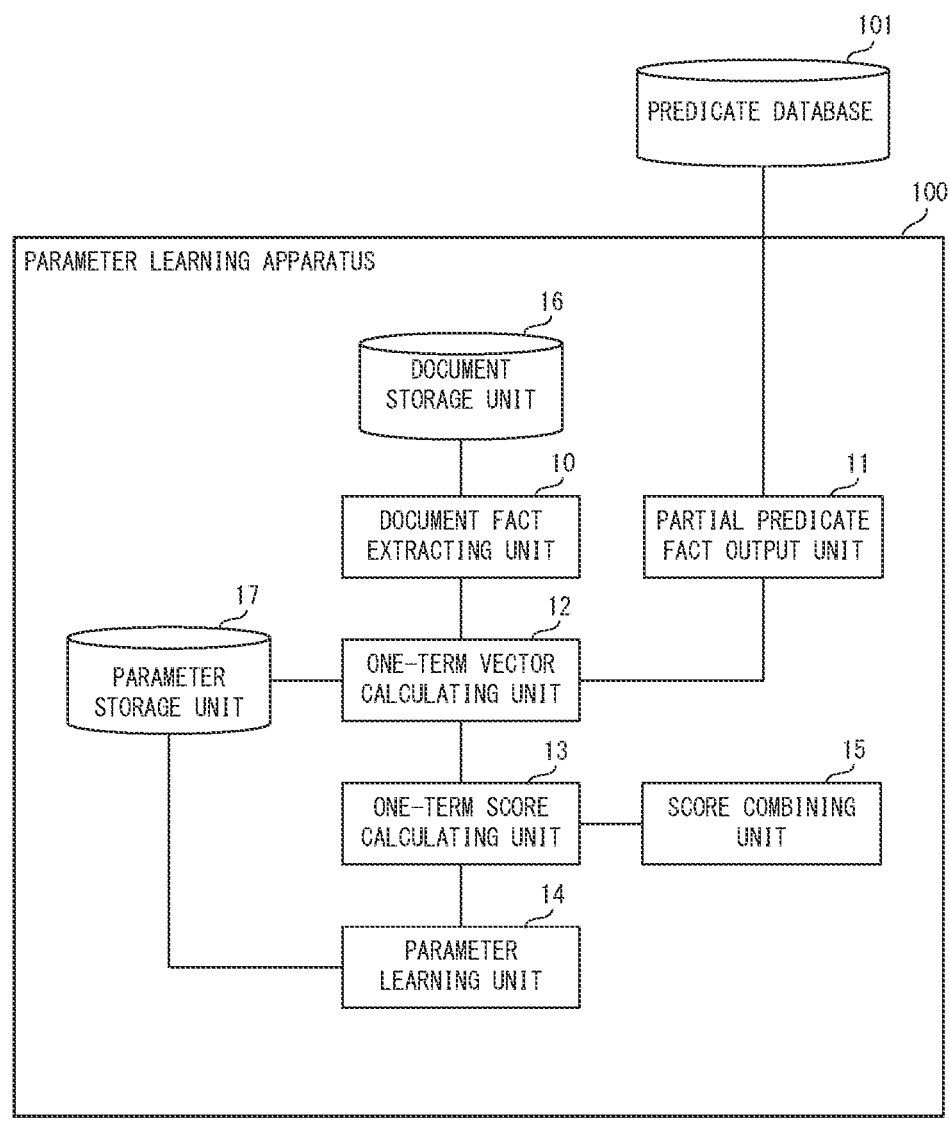
FIG. 2 is a block diagram that illustrates the configuration of the parameter learning apparatus according to the first example embodiment in a more specific manner.

Subsequently, the configuration and functions of the parameter learning apparatus 100 according to the first example embodiment will be described more specifically using FIGS. 2 to 5. FIG. 2 is a block diagram that illustrates the configuration of the parameter learning apparatus according to the first example embodiment in a more specific manner. As illustrated in FIG. 2, in the first example embodiment, the parameter learning apparatus 100 is connected to an external predicate database 101.

Also, the parameter learning apparatus 100 includes a document storage unit 16 and a parameter storage unit 17, in addition to the constituent elements described above. The document storage unit 16 stores documents and appearance position information. The parameter storage unit 17 stores parameters to be used by the one-term vector calculating unit 12.

In the present example embodiment, the range of entities is set in advance according to the predicate relationship that it is desired to output, such as "characters, proper nouns related to movies". Also, the appearance position information is held in a form that makes it possible to understand the positions at which a plurality of entities appear in the original document on a word-by-word basis, like "<entity 1><entity 1>plays <entity 3><entity 3> in the <entity 2><entity 2>series." with respect to a document "Harrison Ford plays Han Solo in the Star Wars series.", for example.

In this case, the document fact extracting unit 10 extracts a combination of entities that co-occur with each other from a document stored in the document storage unit 16. Also, the document fact extracting unit 10 regards the pair of the text representation including this document and appearance position information and this combination of entities as a document fact. Also, the document fact extracting unit 10 extracts entities that constitute the document fact one by one, and outputs the combination of the extracted entity and the text representation as a one-term document fact. A plurality of one-term document facts are output from one document fact, according to the number of entities that constitute the combination of entities.

Figure 3:
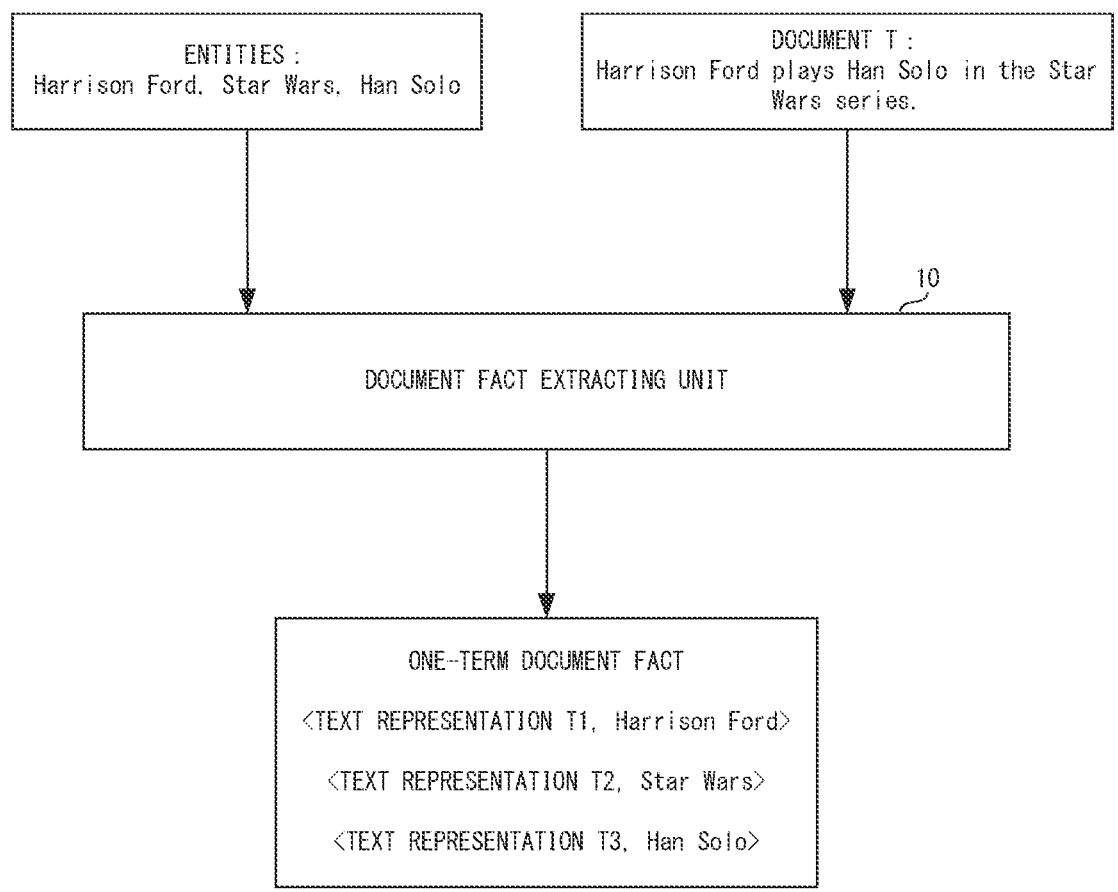
FIG. 3 is a diagram illustrating an example of functions of a document fact extracting unit according to the first example embodiment.

FIG. 3 is a diagram illustrating an example of functions of the document fact extracting unit according to the first example embodiment. In the example in FIG. 3, the document fact extracting unit 10 extracts <Harrison Ford, Star Wars, Han Solo> from a document T: "Harrison Ford plays Han Solo in the Star Wars series.", as a combination of entities. Also, the document fact extracting unit 10 outputs <text representation T1, Harrison Ford>, <text representation T2, Star Wars>, and <text representation T3, Han Solo>, as one-term document facts.

Here, the text representation T1, the text representation T2, and the text representation T3 are obtained by adding the appearance position information to the document T, and are held in a form of text representation T1: "<entity> <entity> plays Han Solo in the Star Wars series.", text representation T2: "Harrison Ford plays Han Solo in the <entity> <entity> series.", text representation T3: "Harrison Ford plays <entity> <entity> in the Star Wars series.", for example.

Entities (person, proper nouns related to movies) and a related predicate are registered in the predicate database 101 in advance as a predicate relationship. In the first example embodiment, the partial predicate fact output unit 11 extracts a predicate related to this combination of entities by searching the predicate database 101 using the combination of a plurality of entities that co-occur in a predetermined range of a document as a query.

Also, the partial predicate fact output unit 11 regards the combination of entities used as a query and the extracted predicate as a predicate fact. Next, the partial predicate fact output unit 11 extracts entities that constitute the predicate fact one by one, and outputs the combination of the extracted entity and the predicate as a one-term partial predicate fact. A plurality of one-term partial predicate facts are output from one predicate fact according to the number of entities that constitute the combination of entities. Note that the predicate that constitutes a one-term partial predicate fact may be another predicate that is defined from the predicate that constitutes the original predicate fact.

Figure 4:
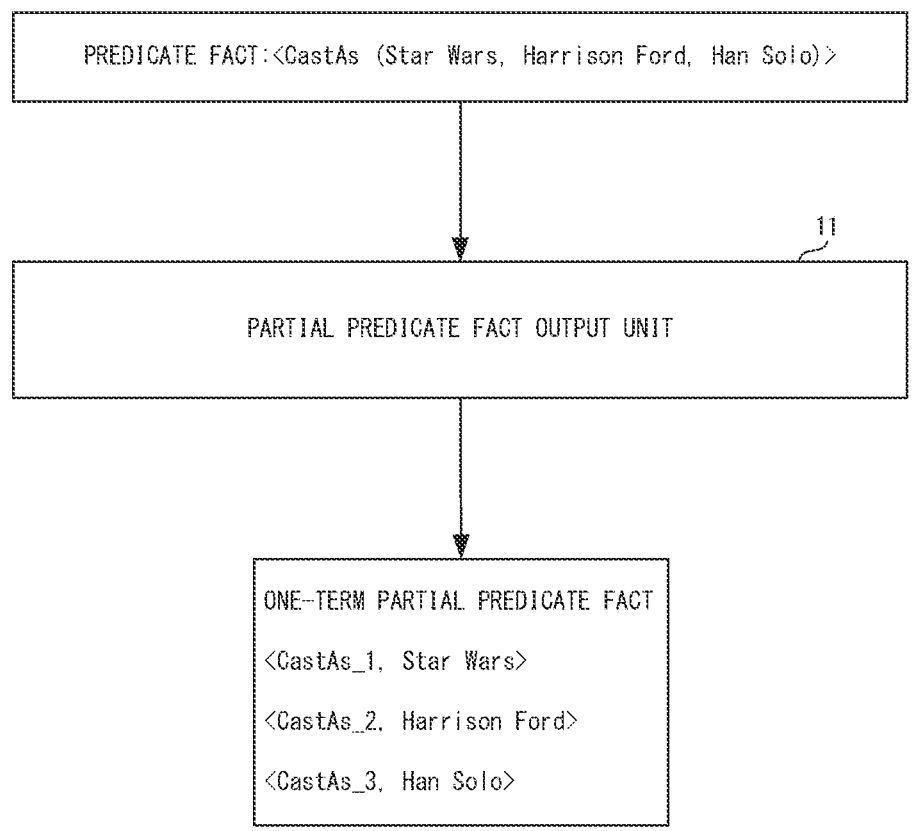
FIG. 4 is a diagram illustrating an example of functions of a partial predicate fact output unit according to the first example embodiment.

FIG. 4 is a diagram illustrating an example of functions of the partial predicate fact output unit according to the first example embodiment. In the example in FIG. 4, the partial predicate fact output unit 11 extracts "CastAs (Star Wars, Harrison Ford, Han Solo)" as a predicate fact. Thereafter, the partial predicate fact output unit 11 outputs <CastAs_1, Star Wars>, <CastAs_2, Harrison Ford>, and <CastAs_3, Han Solo>, as one-term partial predicate facts. Note that CastAs_1, CastAs_2, CastAs_3 are new predicates each having one argument that respectively correspond to the first, second, and third arguments of the predicate CastAs.

In the first example embodiment, the one-term vector calculating unit 12 compares the one-term partial predicate facts output from the partial predicate fact output unit 11 with a table in which a one-term partial predicate feature vector is registered in advance for each predicate. Then, the one-term vector calculating unit 12 specifies a one-term partial predicate feature vector representing the feature of each one-term partial predicate fact from the result of comparison. The parameter storage unit 17 stores the table in which a one-term partial predicate feature vector is registered in advance for each predicate as a parameter.

Moreover, the one-term vector calculating unit 12 specifies, by comparing a one-term document fact extracted by the document fact extracting unit 10 with a table in which a one-term text representation feature vector is registered in advance for each text representation, a one-term text representation feature vector that represents the feature of a text representation in the one-term document fact. Also, in the table, specifically, a corresponding one-term text representation feature vector is registered for each character string of a text representation of a one-term document fact, for each bag-of-word vector of these character strings, or for each context character string in the vicinity of the appearance positions of entities in text representations in these character strings. In this case, the parameter storage unit 17 stores a table in which the one-term text representation feature vector is stored for each text representation as a parameter.

Also, the one-term vector calculating unit 12 can also specify the one-term text representation feature vector, by inputting a character string of a text representation of a one-term document fact, a bag-of-word vector of the character string, or a context character string in the vicinity of the appearance positions of entities in the text representation in the character string into a neural network. The recurrent neural network described above is an example of such a neural network. In this case, the parameter storage unit 17 stores the weight parameters of the neural network as parameters.

Also, the one-term vector calculating unit 12 obtains the entity that constitutes a one-term partial predicate fact output from the partial predicate fact output unit 11, or the entity that constitutes a one-term document fact extracted by the document fact extracting unit 10. Then, the one-term vector calculating unit 12 compares the obtained entity with a table in which a one-term entity feature vector is registered for each entity in advance, and as a result of comparison, specifies the one-term entity feature vector that represents the feature of the entity. The parameter storage unit 17 also stores a table in which a one-term entity feature vector is registered for each entity in advance as a parameter.

In addition, the one-term vector calculating unit 12 can also specify the one-term entity feature vector representing the feature of an entity by specifying a real vector representing the feature of a predicate or a text representation corresponding to the obtained entity, and inputting the specified real vector into a neural network. A recurrent neural network that receives a series of real vectors of a predetermined number and outputs other real vectors of the predetermined number is an example of such a neural network. In this case, the parameter storage unit 17 stores the aforementioned weight parameters of the neural network as parameters.

Further, the processing performed by the one-term score calculating unit 13 will be described using FIG. 5. FIG. 5 is a diagram illustrating a score to be calculated in the first example embodiment.

A specific example of a matrix X is shown in FIG. 5. As shown in FIG. 5, in the matrix X, the rows i are defined by entities that constitute one-term document facts or one-term partial predicate facts. The columns j are defined by text representations and predicates that constitute the one-term document facts or the one-term partial predicate facts. Also, finally, one-term scores calculated by the one-term score calculating unit 13 are elements of the matrix X.

Also, in the example in FIG. 5, the one-term score calculating unit 13 calculates a score $S_{ij}$ that is an element of the matrix X by inputting a one-term entity feature vector and a one-term partial predicate feature vector or a one-term text representation feature vector to a score function.

A function shown by following Math. 1 is an example of the score function. In the score function shown in Math. 1, with respect to an element (denoted as $i^{th}$ row and $j^{th}$ column) of the matrix X for which the score is to be calculated, an inner product between a one-term entity feature vector $e_i$ of the entity corresponding to row i and a feature vector $r_j$ of the text representation or the predicate corresponding to column j (one-term text representation feature vector or one-term partial predicate feature vector) is calculated, which is score $S_{ij}$.

$$f_{score}(e_i, r_j) = e_i^T r_j \quad \text{[Math. 1]}$$

In the first example embodiment, the parameter learning unit 14 randomly samples an element corresponding to a one-term document fact or a one-term partial predicate fact (element for which the first one-term score is calculated) in the matrix X (in the following, an element at $i^{th}$ row and $j^{th}$ column is sampled). Next, the parameter learning unit 14 randomly samples an element corresponding to neither of the one-term document fact nor the one-term partial predicate fact (element for which the second one-term score is calculated) in the matrix X (in the following, an element at $i'^{th}$ row and $j'^{th}$ column is sampled). Then, the parameter learning unit 14 calculates a score $Si_j$ and a score $Sir$ of the respective sampled elements, and updates the parameters to be used by the one-term vector calculating unit 12 with use of a gradient method, such that the loss shown by the following Math. 2 decreases.

$$\text{Loss} = -\log(\sigma(S_{ij} - S_{i'j'})) \quad \text{[Math. 2]}$$

In the first example embodiment, the score combining unit 15 calculates a score indicating the degree of establishment regarding a combination of a plurality of entities and a related predicate using the one-term scores calculated by the one-term score calculating unit 13, as described above.

Specifically, similarly to the predicate fact, the score combining unit 15 inputs the combination into the partial predicate fact output unit 11 and receives a plurality of one-term partial predicate facts that are output (in the following, K one-term partial predicate facts are received). Next, the score combining unit 15 receives, with respect to each of the elements corresponding to the received K one-term partial predicate facts, the one-term score output from the one-term score calculating unit 13.

Then, the score combining unit 15, using the following Math. 3, multiplies the received K one-term scores $s_k$ (where k=1, . . . , K) by weights $w_k$, adds up the obtained multiplied values, and outputs the resultant value as the score of the combination described above. Note that the weights $w_k$ may also be set for each predicate fact or for each of the predicates that constitute combinations of a plurality of entities and related predicates. Also, the score combining unit 15 may also output the sum of one-term scores as the score of the combination without using the weights.

$$\text{score}_{ij} = \sum_{k=1}^{K} w_k s_k \quad \text{[Math. 3]}$$

[Apparatus Operations]

Figure 6:
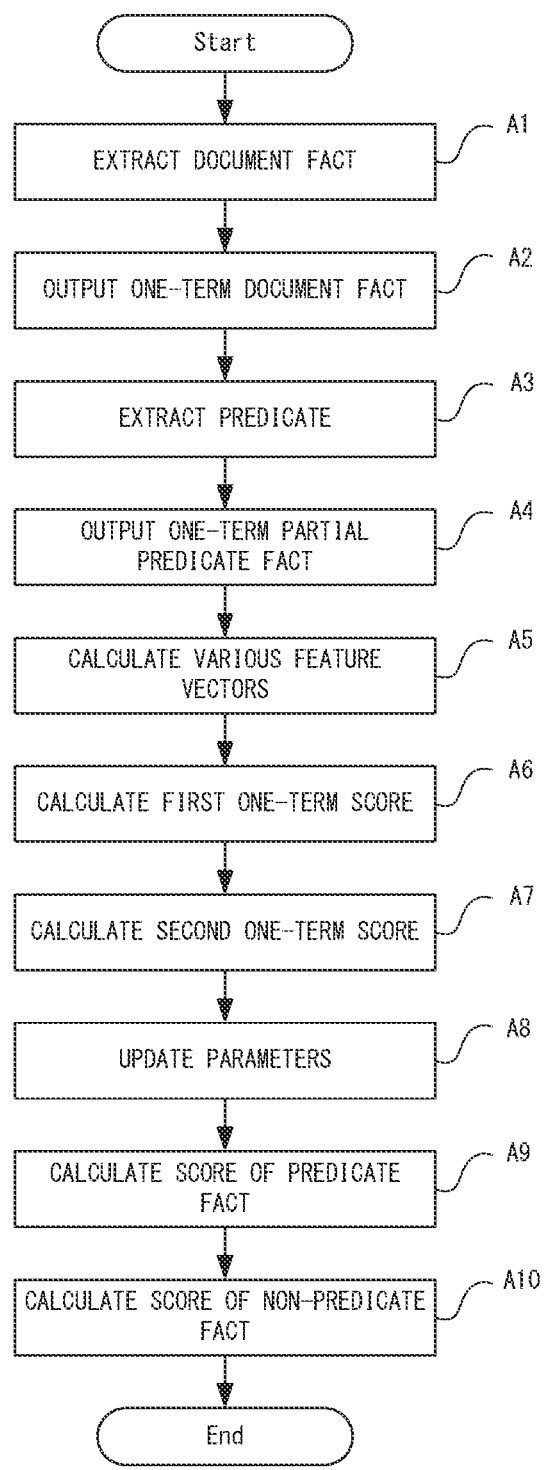
FIG. 6 is a flow diagram illustrating operations of a parameter learning apparatus according to the first example embodiment.

Next, the operations of the parameter learning apparatus 100 according to the first example embodiment will be described using FIG. 6. FIG. 6 is a flow diagram illustrating the operations of the parameter learning apparatus according to the first example embodiment. In the following description, FIG. 1 to FIG. 5 will be referred to as appropriate. Furthermore, in the first example embodiment, the parameter learning method is implemented by operating the parameter learning apparatus 100. Therefore, the following description of the operations of the parameter learning apparatus 100 applies to the parameter learning method according to the first example embodiment.

As shown in FIG. 6, first, in the parameter learning apparatus 100, the document fact extracting unit 10 extracts a combination of entities that co-occur with each other in a predetermined range from a document stored in the document storage unit 16, and regards a pair of a text representation including this document and appearance position information and the combination of entities as a document fact (step A1).

Next, the document fact extracting unit 10 extracts entities that constitute the document fact extracted in step A1 one by one, and outputs the combination of the extracted entity and the text representation as a one-term document fact (step A2).

Next, the partial predicate fact output unit 11 extracts, by searching the predicate database 101 using a combination of a plurality of entities that co-occur in a predetermined range of a document as a query, a predicate related to the combination of entities (step A3). The pair of the combination of entities, which is the query, and the extracted predicate is a predicate fact.

Next, the partial predicate fact output unit 11 extracts the entities that constitute the predicate fact one by one, and outputs the combination of the extracted entity and the predicate as a one-term partial predicate fact (step A4).

Next, the one-term vector calculating unit 12 calculates the one-term partial predicate feature vector, the one-term text representation feature vector, and the one-term entity feature vector using a preset table and a neural network (step A5).

Next, the one-term score calculating unit 13 calculates a first one-term score using the one-term partial predicate feature vector, the one-term text representation feature vector, and the one-term entity feature vector (step A6).

Moreover, the one-term score calculating unit 13 calculates second one-term scores with respect to a combination of one entity and a predicate that is not extracted as the one-term partial predicate fact, and a combination of one entity and a text representation that is not extracted as the one-term document fact (step A7).

Next, the parameter learning unit 14 updates the parameters to be used in step A5 with use of a gradient method, such that the first one-term score calculated in step A6 is higher than the second one-term score calculated in step A7, specifically such that the loss shown by Math. 2 decreases (step A8).

Next, the score combining unit 15 calculates, for each predicate fact, a score indicating the degree of establishment of the predicate fact using the first one-term score calculated in step A6 and the second one-term score calculated in step A7 (step A9).

Moreover, the score combining unit 15 calculates, with respect to combinations of a plurality of entities and related predicates that are not obtained as predicate facts as well, scores indicating the degree of establishment thereof using the first one-term score calculated in step A7 and the second one-term score calculated in step A8 (step A10). After execution of step A10, the processing in the parameter learning apparatus 100 is ended.

[Effects of First Example Embodiment]

First, in the first example embodiment, scores are calculated after the predicate fact and the document fact are broken down into one-term partial predicate facts and one-term document facts each including only one entity, and thereafter the scores are combined. Therefore, the first example embodiment can also be applied to a learning model for extracting a predicate having three or more arguments.

Also, in the first example embodiment, learning of parameters is performed such that a higher score is calculated for a pair, of pairs of an entity and a predicate or a text representation, that is extracted as a one-term partial predicate fact or a one-term document fact, compared to a pair that has not been extracted thereas. This, accordingly, achieves an advantageous effect whereby, in a case where a one-term partial predicate fact or a one-term document fact with a similar entity is obtained, there is a similar tendency between the predicate relationship and the text representation in terms of the magnitudes of one-term scores to be calculated. Due to this similarity relationship, a predicate relationship can be predicted even from a text representation to which a label of a predicate relationship has not been directly appended in training data.

In addition, consequently, learning of parameters for extracting a predicate relationship from a document can be performed efficiently, which increases the processing speed in a calculator that executes the learning.

[Program]

It is sufficient that the program according to the present example embodiment be a program that causes a computer to execute steps A1 to A10 illustrated in FIG. 6. The parameter learning apparatus 100 and the parameter learning method according to the first example embodiment can be realized by installing this program in the computer and executing this program. In this case, a processor of the computer functions and performs processing as the document fact extracting unit 10, the partial predicate fact output unit 11, the one-term vector calculating unit 12, the one-term score calculating unit 13, the parameter learning unit 14, and the score combining unit 15.

Also, in the first example embodiment, the document storage unit 16, and the parameter storage unit 17 are realized by storing a data file that configures these in a storage device included in the computer, such as a hard disk.

Also, the document storage unit 16 and the parameter storage unit 17 may be constructed on a computer different from the computer that executes the program according to the first example embodiment.

Also, the program according to the first example embodiment may be executed by a computer system constructed by a plurality of computers. In this case, for example, each computer may function as one of the document fact extracting unit 10, the partial predicate fact output unit 11, the one-term vector calculating unit 12, the one-term score calculating unit 13, the parameter learning unit 14, and the score combining unit 15.

Second Example Embodiment

In the following, a parameter learning apparatus, a parameter learning method, and a program according to a second example embodiment will be described with reference to FIGS. 7 to 11.

[Apparatus Configuration]

Figure 7:
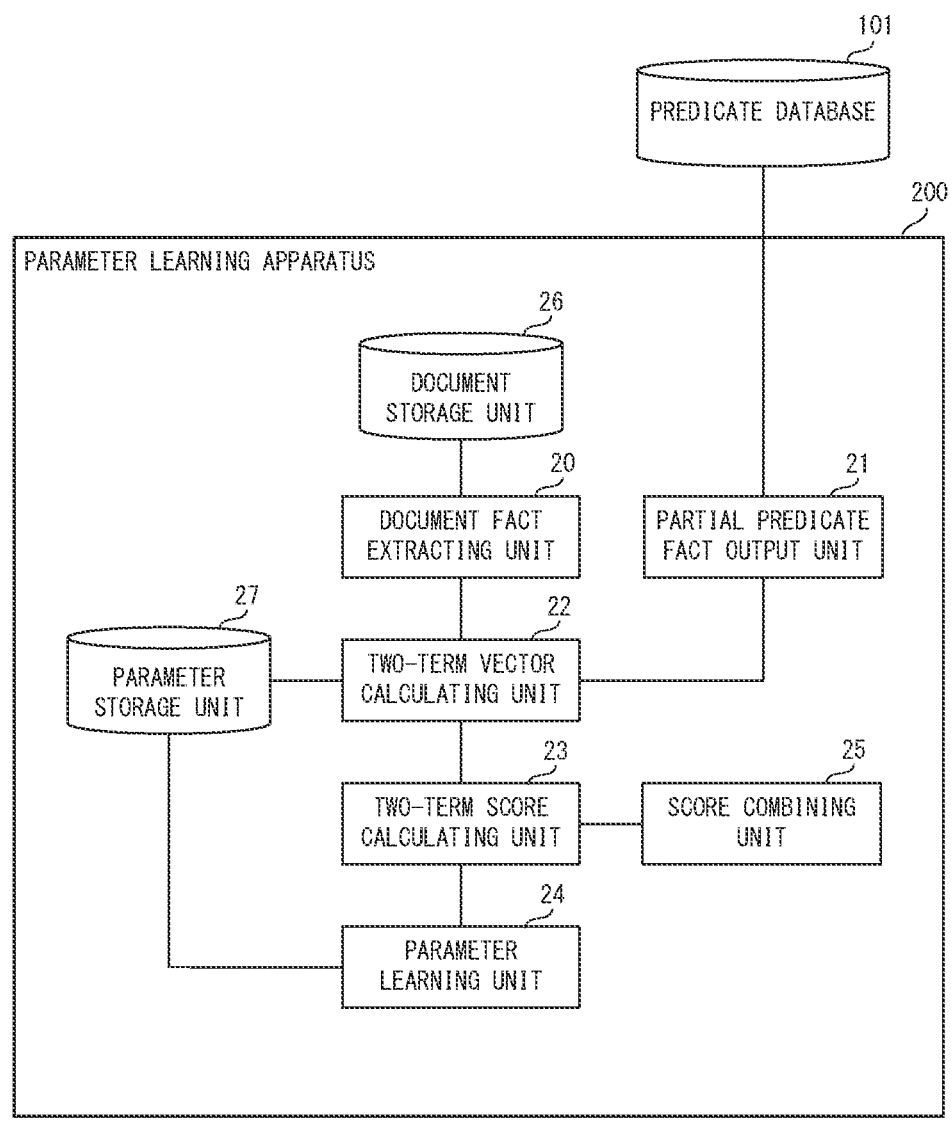
FIG. 7 is a block diagram illustrating a configuration of a parameter learning apparatus according to a second example embodiment.

First, a configuration of the parameter learning apparatus according to the second example embodiment will be described using FIG. 7. FIG. 7 is a block diagram illustrating a configuration of the parameter learning apparatus according to the second example embodiment.

A parameter learning apparatus 200 according to the second example embodiment shown in FIG. 7 performs learning of parameters of a learning model for extracting a predicate relationship from a document, similarly to the parameter learning apparatus 100 in the first example embodiment.

As shown in FIG. 7, the parameter learning apparatus 200 includes a document fact extracting unit 20, a partial predicate fact output unit 21, a two-term vector calculating unit 22, a two-term score calculating unit 23, a parameter learning unit 24, and a score combining unit 25. Also, the parameter learning apparatus 200 also includes a document storage unit 26 and a parameter storage unit 27 in addition to the constituent elements described above. Moreover, the parameter learning apparatus 200 is also connected to the external predicate database 101, similarly to the parameter learning apparatus 100 in the first example embodiment.

In the second example embodiment, the document fact extracting unit 20 extracts a two-term document fact from a set of entities that are each a string of words, a document in which the entities appear, and information regarding the appearance positions of the entities in the document (appearance position information). The tow-term document fact is constituted of a pair of two entities that appear in a predetermined range in a document and a text representation. In the second example embodiment, the text representation includes information indicating a string of words that is present in the predetermined range, and the appearance positions of the two entities in the string of words.

The partial predicate fact output unit 21 obtains, similarly to the partial predicate fact output unit 11 in the first example embodiment, a plurality of entities in a predetermined range and a related predicate, as a predicate fact, from the predicate database 101.

Note that, in the second example embodiment, the partial predicate fact output unit 21 outputs, for each combination of two entities selected from the plurality of entities that constitute the predicate fact, the predicate that constitutes the predicate fact and the combination of two entities as a two-term partial predicate fact, using the obtained predicate fact.

The two-term vector calculating unit 22 calculates a two-term partial predicate feature vector, a two-term text representation feature vector, and a two-term entity combination feature vector using a set parameter. The two-term partial predicate feature vector is a vector representing the feature of the predicate in the two-term partial predicate fact. The two-term text representation feature vector is a vector representing the feature of the text representation in the two-term document fact. The two-term entity combination feature vector is a vector representing the feature of the combination of two entities in the two-term partial predicate fact or the two-term document fact.

The two-term score calculating unit 23 calculates, with respect to a two-term partial predicate fact, a score indicating the degree of establishment of the two-term partial predicate fact, as a first two-term score, using the two-term partial predicate feature vector and the two-term entity combination feature vector that are calculated from the two-term partial predicate fact. Moreover, the two-term score calculating unit 23 calculates, with respect to a two-term document fact, a score indicating the degree of establishment of the two-term document fact, as the first two-term score, using the two-term text representation feature vector and the two-term entity combination feature vector that are calculated from the two-term document fact.

Also, the two-term score calculating unit 23 calculates, with respect to a combination of two entities and a predicate that is not extracted as the two-term partial predicate fact, a score indicating the degree of establishment of the combination, as a second two-term score. In addition, the two-term score calculating unit 23 calculates, with respect to a combination of two entities and a text representation that is not extracted as the two-term document fact as well, a score indicating the degree of establishment of the combination, as a second two-term score.

The parameter learning unit 24 updates the parameters to be used in the two-term vector calculating unit 22 such that the first two-term score is higher than the second two-term score with use of a gradient method.

The score combining unit 25 calculates, for each predicate fact, a score indicating the degree of establishment of the predicate fact using the first two-term score and the second two-term score. Moreover, the score combining unit 25 calculates, with respect to a combination of a plurality of entities and a related predicate that is not obtained as the predicate fact, a score indicating the degree of establishment of the combination.

Next, the configuration and functions of the parameter learning apparatus 200 according to the second example embodiment will be described more specifically using FIGS. 8 to 10. First, in the second example embodiment as well, the document storage unit 26 stores documents and appearance position information, similarly to the document storage unit 16 in the first example embodiment. The stored documents and appearance position information are similarly to those shown in the first example embodiment. Moreover, in the second example embodiment as well, the range of entities is preset according to the predicate relationship that it is desired to output such as "persons, proper nouns relating to countries", for example.

The document fact extracting unit 20 extracts a combination of entities that co-occur with other from a document stored in the document storage unit 26, similarly to the example of the first example embodiment. Then, the document fact extracting unit 10 regards a pair of a text representation including information regarding the document and the appearance position information and the combination of entities, as a document fact. Note that, in the second example embodiment, the document fact extracting unit 10 extracts the entities that constitutes the document fact in units of two, and outputs the combination of the extracted two entities and the text representation as a two-term document fact. A plurality of two-term document facts are output from one document fact according to the number of entities that constitute the combinations of entities.

Figure 8:
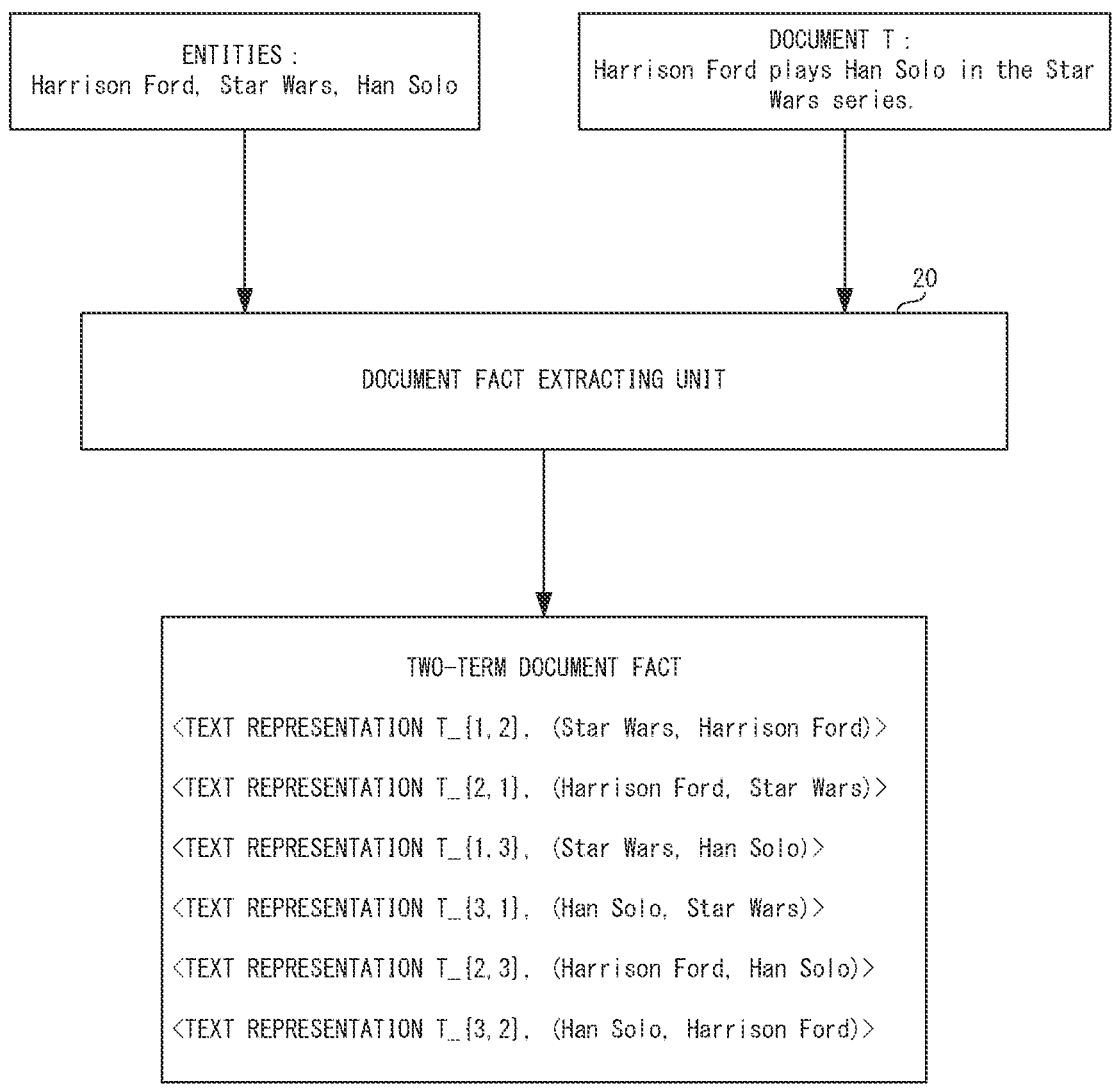
FIG. 8 is a diagram illustrating an example of functions of a document fact extracting unit 10 according to the second example embodiment.

FIG. 8 is a diagram illustrating an example of functions of the document fact extracting unit 10 according to the second example embodiment. In the example in FIG. 8, the document fact extracting unit 20 extracts <Harrison Ford, Star Wars, Han Solo> as a combination of entities from a document T: "Harrison Ford plays Han Solo in the Star Wars series.". Also, the document fact extracting unit 10 outputs following sets of the two-term document fact.

<text representation T_{1,2}, (Star Wars, Harrison Ford)>
<text representation T_{2,1}, (Harrison Ford, Star Wars)>
<text representation T_{1,3}, (Star Wars, Han Solo)>
<text representation T_{3,1}, (Han Solo, Star Wars)>
<text representation T_{2,3}, (Harrison Ford, Han Solo)>
<text representation T_{3,2}, (Han Solo, Harrison Ford)>

Here, the text representation T_{i,j} is obtained by adding the appearance position information regarding $i^{th}$ and $j^{th}$ entities to the document T. For example, the text representation T_{1,2} is held in a form such as "<entity 1> <entity 1> plays Han Solo in the <entity 2> <entity 2> series.".

In the second example embodiment as well, the partial predicate fact output unit 21 extracts, by searching the predicate database 101 using a combination of a plurality of entities that co-occur in a predetermined range of the document as a query, a predicate related to the combination of entities.

Also, the partial predicate fact output unit 21 regards the combination of the entities used as a query and the extracted predicate as a predicate fact. Next, the partial predicate fact output unit 11 extracts entities that constitute the predicate fact in units of two, and outputs the combination of the extracted two entities and the predicate, as a two-term partial predicate fact. A plurality of two-term partial predicate facts are output from one predicate fact according to the number of the entities that constitute the combination of entities. Note that the predicate that constitutes a two-term partial predicate fact may be another predicate that is defined from the predicate that constitutes the original predicate fact.

Figure 9:
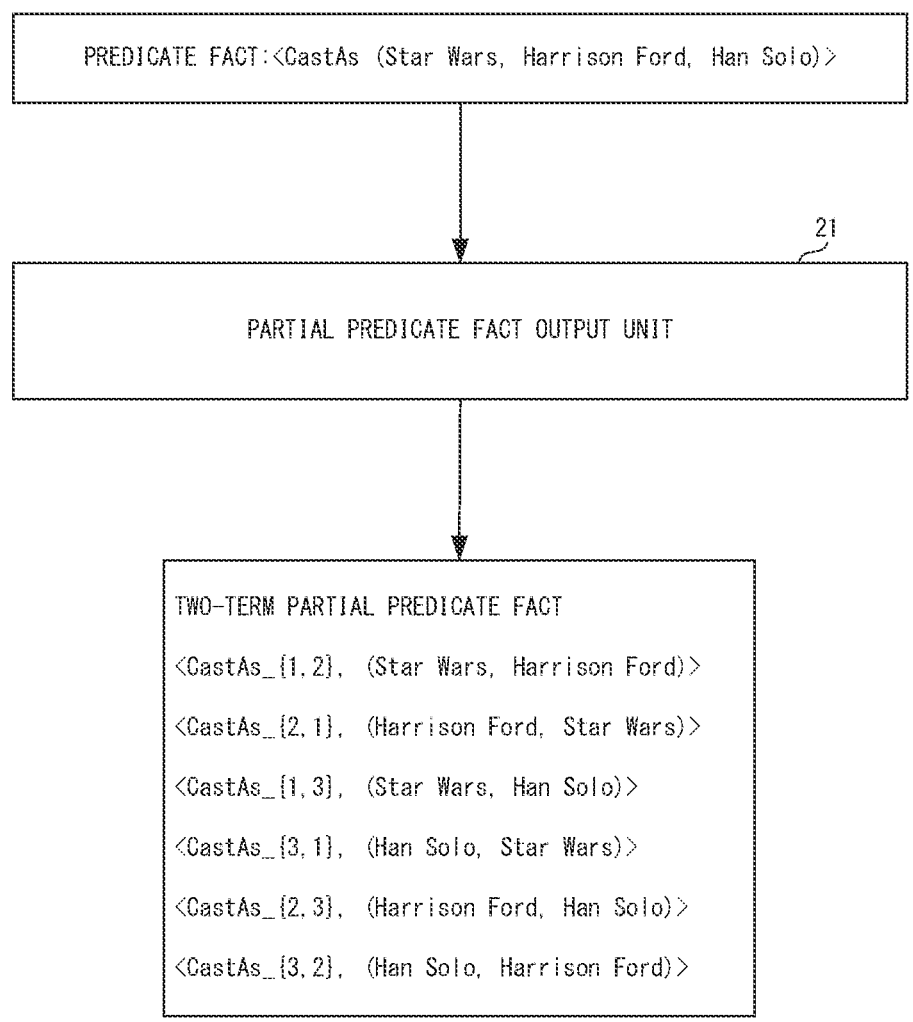
FIG. 9 is a diagram illustrating an example of functions of a partial predicate fact output unit according to the second example embodiment.

FIG. 9 is a diagram illustrating an example of functions of the partial predicate fact output unit according to the second example embodiment. In the example in FIG. 9, the partial predicate fact output unit 21 extracts "CastAs (Star Wars, Harrison Ford, Han Solo)" as the predicate fact. Thereafter, the partial predicate fact output unit 21 outputs the following set of two-term partial predicate facts. Note that CastAs_{i, j} is a new predicate whose number of arguments is two and that corresponds to a combination of $i^{th}$ and $j^{th}$ arguments of the predicate CastAs.

<CastAs_{1,2}, (Star Wars, Harrison Ford)>
<CastAs_{2,1}, (Harrison Ford, Star Wars)>
<CastAs_{1,3}, (Star Wars, Han Solo)>
<CastAs_{3,1}, (Han Solo, Star Wars)>
<CastAs_{2,3}, (Harrison Ford, Han Solo)>
<CastAs_{3,2}, (Han Solo, Harrison Ford)>

In the second example embodiment, the parameter storage unit 27 stores parameters to be used by the two-term vector calculating unit 22. A specific example of the parameter is shown below.

In the second example embodiment, the two-term vector calculating unit 22 compares the two-term partial predicate fact output from the partial predicate fact output unit 21 with a table in which the two-term partial predicate feature vector is registered for each predicate in advance. Then, from the result of comparison, the two-term vector calculating unit 12 specifies a two-term partial predicate feature vector representing the feature of the two-term partial predicate fact. The parameter storage unit 27 stores a table in which a two-term partial predicate feature vector is registered for each predicate in advance as parameters.

Moreover, the two-term vector calculating unit 22 specifies a two-term text representation feature vector representing the feature of a text representation in the two-term document fact by comparing the two-term document fact extracted by the document fact extracting unit 20 with a table in which a two-term text representation feature vector is registered for each text representation in advance. Also, in the table, specifically, a corresponding two-term text representation feature vector is registered for each character string of the text representation of the two-term document fact, for each bag-of-word vector of these character strings, or for each context character string in the vicinity of the appearance positions of the two entities of the text representations in these character string. In this case, the parameter storage unit 27 stores a table in which the two-term text representation feature vector is registered for each text representation as parameters.

Also, the two-term vector calculating unit 22 can also specify the two-term text representation feature vector by inputting a character string of a text representation of a two-term document fact, a bag-of-word vector of the character string, or a context character string in the vicinity of the appearance positions of two entities in the text representation in the character string into a neural network. The recurrent neural network described above is an example of such a neural network. In this case, the parameter storage unit 27 stores the weight parameters of the neural network as parameters.

Also, the two-term vector calculating unit 22 obtains a combination of entities that constitute a two-term partial predicate fact output from the partial predicate fact output unit 21, or a combination of entities that constitute a two-term document fact extracted by the document fact document fact extracting unit 20. Then, the two-term vector calculating unit 22 compares the obtained combination of entities with a table in which a two-term entity feature vector is registered for each combination of two entities in advance, and as a result of comparison, specifies the two-term entity feature vector that represents the feature of the combination of two entities. The parameter storage unit 27 also stores a table in which a two-term entity feature vector is registered for each two entities in advance as a parameter.

In addition, the two-term vector calculating unit 22 can also specify the two-term entity combination feature vector representing the feature of a combination of two entities by specifying a real vector representing the feature of a predicate or a text representation corresponding to the obtained combination of two entities, and inputting the specified real vector into a neural network. A recurrent neural network that receives a series of real vectors of a predetermined number and outputs other real vectors of the predetermined number is an example of such a neural network. In this case, the parameter storage unit 27 stores the aforementioned weight parameters of the neural network as parameters.

Next, the processing performed by the two-term score calculating unit 23 will be described using FIG. 10. FIG. 10 is a diagram illustrating a score to be calculated in the second example embodiment.

A specific example of a matrix Y is shown in FIG. 10. As shown in FIG. 10, in the matrix Y, the rows i are defined by combinations of entities that constitute a two-term document fact or a two-term partial predicate fact. Note that, in FIG. 10, the entities are represented by initials. The columns j in the matrix Y are defined by combinations of two entities, text representations that constitute the two-term document fact, or predicates that constitute the two-term partial predicate fact. Also, finally, two-term scores calculated by the two-term score calculating unit 23 are elements of the matrix Y.

Also, in this case, the two-term score calculating unit 23 calculates a score $S_{ij}$, which is an element of the matrix Y by inputting the two-term entity feature vector and the two-term partial predicate feature vector or the two-term text representation feature vector to a score function. Math. 1 shown in the first example embodiment is an example of the score function in the second example embodiment as well.

In the second example embodiment, the parameter learning unit 24 randomly samples an element corresponding to the two-term document fact or the two-term partial predicate fact (element for which the first two-term score is calculated) in the matrix Y (in the following, an element on $i^{th}$ row and $j^{th}$ column is sampled). Next, the parameter learning unit 24 randomly samples an element corresponding to neither of the two-term document fact nor the two-term partial predicate fact (element for which the second two-term score is calculated) in the matrix Y (in the following, an element on $i'^{th}$ row and $j'^{th}$ column is sampled).

Then, the parameter learning unit 24 calculates a first two-term score $S_{ij}$ and a second two-term score Sir of the respective sampled elements, and updates the parameters to be used by the two-term vector calculating unit 22 such that the loss indicated by Math. 2 shown in the first example embodiment decreases with use of a gradient method.

In the second example embodiment, the score combining unit 25 calculates a score indicating the degrees of establishment regarding a combination of a plurality of entities and a related predicate using the two-term score calculated by the two-term score calculating unit 23, as described above.

Specifically, similarly to the predicate fact, the score combining unit 25 inputs the combination into the partial predicate fact output unit 21 and receives a plurality of two-term partial predicate facts that are output (in the following, K two-term partial predicate facts are received). Next, the score combining unit 25 receives, with respect to each of elements corresponding to the received K two-term partial predicate facts, a two-term score output from the two-term score calculating unit 23.

Then, the score combining unit 25, using Math. 3 shown in the first example embodiment, multiplies the received K two-term scores $s_k$ (where k=1, . . . , K) by weights $w_k$, adds up the obtained multiplied values, and outputs the resultant value as the score of the combination described above. Note that the weights $w_k$ may also be set for each related predicate. Also, the score combining unit 25 may also output the sum of two-term scores as the score of the combination without using the weights.

[Apparatus Operations]

Figure 11:
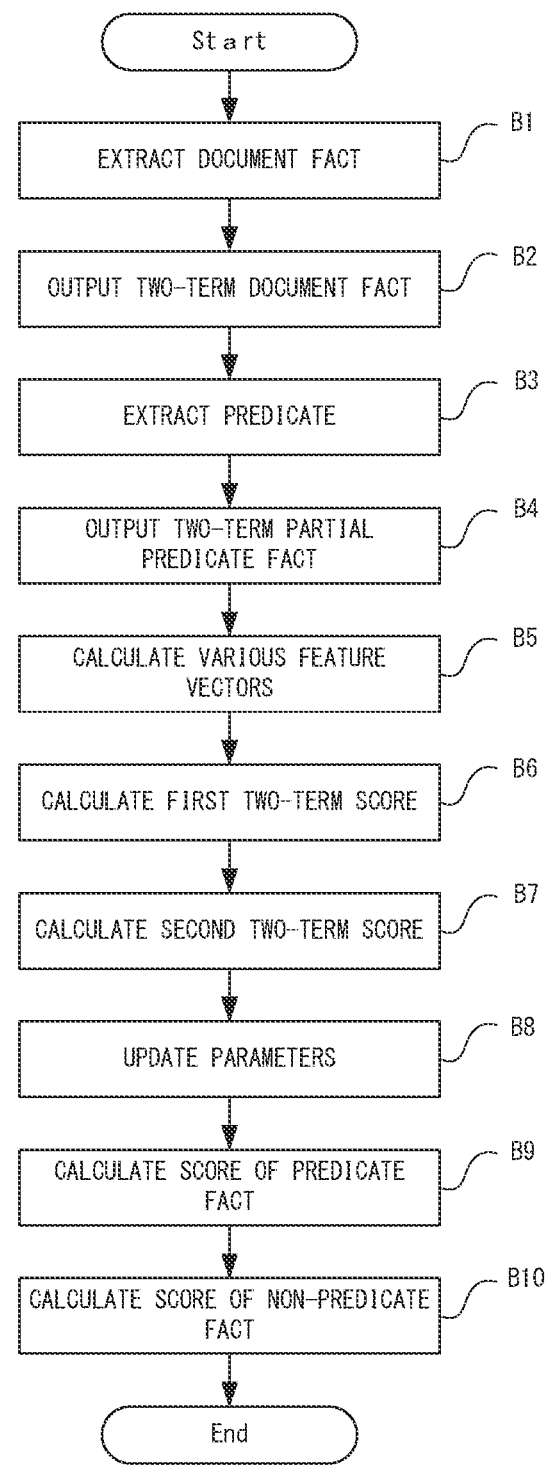
FIG. 11 is a flow diagram illustrating operations of the parameter learning apparatus according to the second example embodiment.

Next, the operations of the parameter learning apparatus 200 according to the second example embodiment will be described using FIG. 11. FIG. 11 is a flow diagram illustrating operations of the parameter learning apparatus according to the second example embodiment. In the following description, FIG. 8 to FIG. 10 will be referred to as appropriate. Furthermore, in the second example embodiment, the parameter learning method is implemented by operating the parameter learning apparatus 200. Therefore, the following description of the operations of the parameter learning apparatus 200 applies to the parameter learning method according to the second example embodiment.

As shown in FIG. 11, first, in the parameter learning apparatus 200, the document fact extracting unit 20 extracts a combination of entities that co-occur with each other in a predetermined range from a document stored in the document storage unit 26, and regards a pair of a text representation including this document and appearance position information and the combination of entities as a document fact (step B1).

Next, the document fact extracting unit 20 extracts entities that constitute the document fact extracted in step B1 in units of two, and outputs the combination of a combination of the extracted entities and the text representation as a two-term document fact (step B2).

Next, the partial predicate fact output unit 21 extracts, by searching the predicate database 101 using a combination of a plurality of entities that co-occur in the predetermined range of the document as a query, a predicate that is related to the combination of entities (step B3). The pair of the combination of entities, which is the query, and the extracted predicate is a predicate fact.

Next, the partial predicate fact output unit 21 extracts the entities that constitute the predicate fact in units of two, and outputs the combination of the combination of the extracted two entities and the predicate as a two-term partial predicate fact (step B4).

Next, the two-term vector calculating unit 22 calculates, using a preset table and a neural network, the two-term partial predicate feature vector, the two-term text representation feature vector, and the two-term entity feature vector, with a set parameter (step B5).

Next, the two-term score calculating unit 23 calculates a first two-term score using the two-term partial predicate feature vector, the two-term text representation feature vector, and the two-term entity feature vector (step B6).

Moreover, the two-term score calculating unit 23 calculates second two-term scores with respect to a combination of a combination of entities that are not extracted as the two-term partial predicate fact and a predicate, and furthermore a combination of a combination of entities that are not extracted as the two-term document fact and a text representation (step B7).

Next, the parameter learning unit 24 updates the parameters to be used in step B5 with use of a gradient method, such that the first two-term score calculated in step B6 is higher than the second two-term score calculated in step B7, specifically such that the loss shown by Math. 2 described above decreases (step B8).

Next, the score combining unit 25 calculates, for each predicate fact, a score indicating the degree of establishment of the predicate fact using the first two-term score calculated in step B6 and the second two-term score calculated in step B7 (step B9).

Moreover, the score combining unit 25 calculates, with respect to combinations of a plurality of entities and related predicates that are not obtained as predicate facts as well, scores indicating the degree of establishment thereof using the first two-term score calculated in step B6 and the second two-term score calculated in step B7 (step B10). After execution of step B10, the processing in the parameter learning apparatus 200 is ended.

[Effects of Second Example Embodiment]

In the second example embodiment, scores are calculated after the predicate fact and the document fact are broken down into two-term partial predicate facts and two-term document facts each including two entities, and thereafter the scores are combined. Therefore, the second example embodiment can also be applied to a learning model for extracting a predicate having an argument of three terms or more, similarly to the first example embodiment.

Also, in the second example embodiment as well, learning of parameters is performed such that a higher score is calculated for a pair, of pairs of entities and a predicate or a text representation, that is extracted as a two-term partial predicate fact or a two-term document fact compared to a pair that has not been extracted thereas, similarly to the first example embodiment. This, accordingly, achieves an advantageous effect whereby, in a case where a two-term partial predicate fact or a two-term document fact with similar entities is obtained, there is a similar tendency between the predicate relationship and the text representations in terms of the magnitudes of two-term scores to be calculated, similarly to the first example embodiment. Due to this similarity relationship, a predicate relationship can be predicted even from a text representation to which a label of a predicate relationship has not been directly appended in training data, similarly to the first example embodiment.

In addition, consequently, learning of parameters for extracting a predicate relationship from a document can be performed efficiently, which increases the processing speed in a computer that executes the learning.

[Program]

It is sufficient that the program according to the second example embodiment be a program that causes a computer to execute steps B1 to B10 illustrated in FIG. 11. The parameter learning apparatus 200 and the parameter learning method according to the second example embodiment can be realized by installing this program in the computer and executing this program. In this case, a processor of the computer functions and performs processing as the document fact extracting unit 20, the partial predicate fact output unit 21, the two-term vector calculating unit 22, the two-term score calculating unit 23, the parameter learning unit 24, and the score combining unit 25.

Also, in the second example embodiment, the document storage unit 26, and the parameter storage unit 27 are realized by storing a data file that configures these in a storage device included in the computer, such as a hard disk. Also, the document storage unit 26 and the parameter storage unit 27 may be constructed on a computer different from the computer that executes the program according to the second example embodiment.

Also, the program according to the second example embodiment may be executed by a computer system constructed by a plurality of computers. In this case, for example, each computer may function as one of the document fact extracting unit 20, the partial predicate fact output unit 21, the two-term vector calculating unit 22, the two-term score calculating unit 23, the parameter learning unit 24, and the score combining unit 25.

Third Example Embodiment

A parameter learning apparatus, a parameter learning method, and a program according to a third example embodiment will be described with reference to FIGS. 12 and 13.

[Apparatus Configuration]

First, a configuration of the parameter learning apparatus according to the third example embodiment will be described using FIG. 12. FIG. 12 is a block diagram illustrating a configuration of the parameter learning apparatus according to the third example embodiment.

Figure 12:
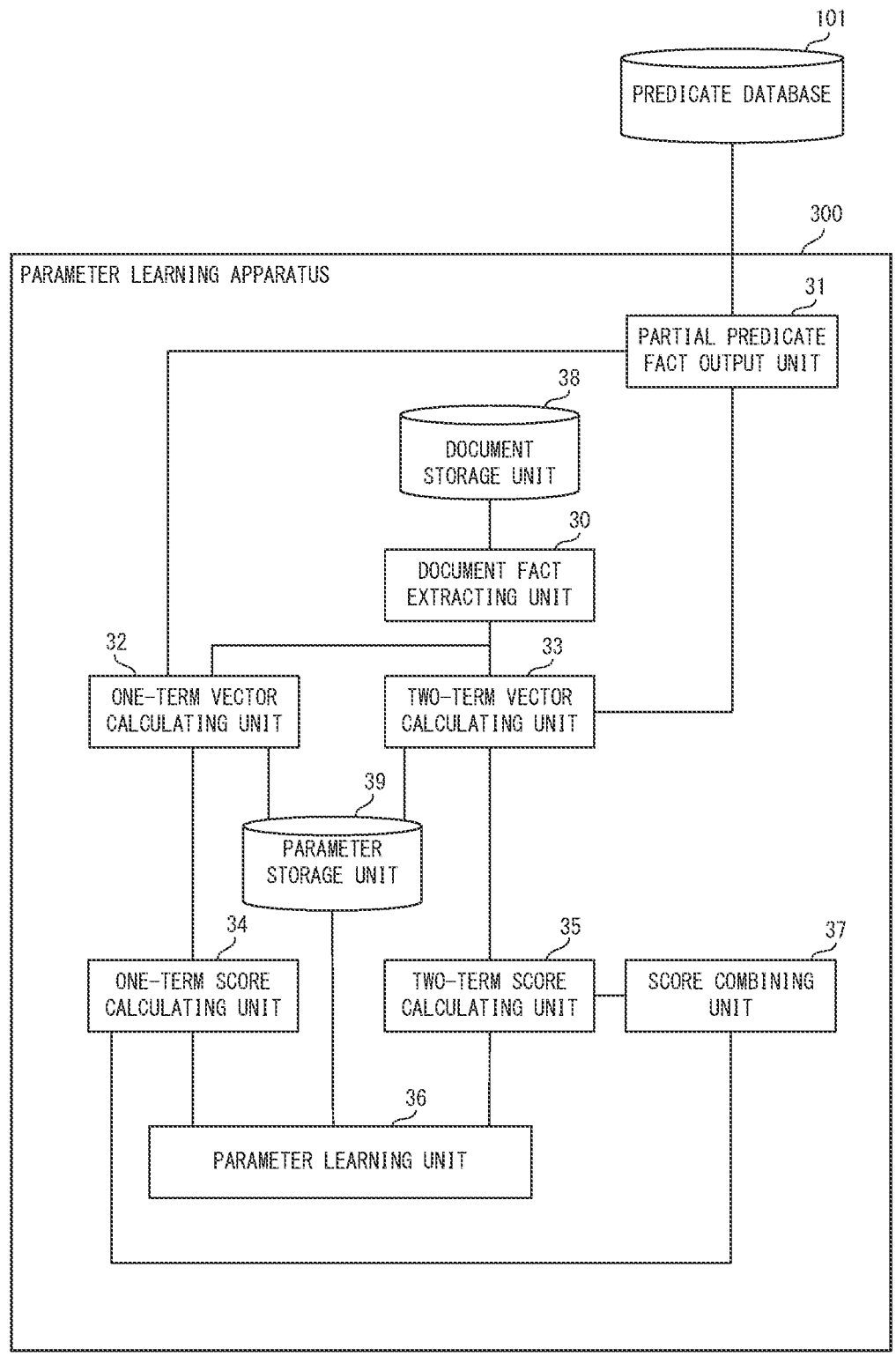
FIG. 12 is a block diagram illustrating a configuration of a parameter learning apparatus according to a third example embodiment.

A parameter learning apparatus 300 according to the third example embodiment shown in FIG. 12 performs learning of parameters of a learning model for extracting a predicate relationship from a document, similarly to the parameter learning apparatuses in the first and second example embodiments.

Also, as shown in FIG. 12, the parameter learning apparatus 300 includes a document fact extracting unit 30, a partial predicate fact output unit 31, a one-term vector calculating unit 32, a two-term vector calculating unit 33, a one-term score calculating unit 34, a two-term score calculating unit 35, a parameter learning unit 36, and a score combining unit 37. That is, the parameter learning apparatus 300 according to the third example embodiment includes the constituent elements of the parameter learning apparatus 100 according to the first example embodiment and the parameter learning apparatus 200 according to the second example embodiment.

Moreover, as shown in FIG. 12, in the third example embodiment as well, the parameter learning apparatus 300 further includes a document storage unit 38 and a parameter storage unit 39. In addition, the parameter learning apparatus 300 is also connected to the eternal predicate database 101 similarly to the parameter learning apparatuses according to the first and second example embodiments.

The document storage unit 38 stores documents and appearance position information, similarly to the first and second example embodiments. The document fact extracting unit 30 extracts a combination of entities that co-occur in a predetermined range from a document stored in the document storage unit 38, and derives a document fact, similarly to the first and second example embodiments. Note that, in the third example embodiment, a one-term document fact and a two-term document fact are output.

The parameter storage unit 39 stores the parameters to be used by the one-term vector calculating unit 32 and the parameters to be used by the two-term vector calculating unit 33, in the third example embodiment.

The one-term vector calculating unit 32 calculates a one-term partial predicate feature vector, a one-term text representation feature vector, and a one-term entity combination feature vector using a set parameter, similarly to the first example embodiment. Also, the two-term vector calculating unit 33 calculates a two-term partial predicate feature vector, a two-term text representation feature vector, and a two-term entity combination feature vector using a set parameter, similarly to the second example embodiment.

The one-term score calculating unit 34 calculates a first one-term score and a second one-term score, similarly to the first example embodiment. Also, the two-term score calculating unit 35 calculates a first two-term score and a second two-term score, similarly to the second example embodiment.

The parameter learning unit 36 updates the parameters to be used by the one-term vector calculating unit 32 with use of a gradient method, such that the first one-term score is higher than the second one-term score, similarly to the first example embodiment. Also, the parameter learning unit 36 also updates the parameters to be used by the two-term vector calculating unit 33 with use of a gradient method, such that the first two-term score is higher than second two-term score, similarly to the second example embodiment.

The score combining unit 37 calculates, for each predicate fact, a score indicating the degree of establishment of the predicate fact using the first one-term score, the second one-term score, the first two-term score, and the second two-term score, differently from the first and second example embodiments. Moreover, the score combining unit 37 calculates, with respect to a combination of a plurality of entities and a related predicate that is not obtained as the predicate fact as well, a score indicating the degree of establishment thereof.

Specifically, the score combining unit 37 inputs this combination into the partial predicate fact output unit 31, and receives K one-term partial predicate facts and L two-term partial predicate facts as outputs. Next, the score combining unit 37 inputs the received one-term partial predicate facts and two-term partial predicate facts respectively into the one-term score calculating unit 34 and the two-term score calculating unit 35, and receives corresponding K one-term scores $s_k^{(1)}$ (k=1, . . . , K) and L two-term scores $s_l^{(2)}$, respectively.

Then, the score combining unit 37 multiplies the one-term scores and two-term scores by weights $w_k^{(1)}$ and $w_l^{(2)}$, respectively, and adds up the respective results, using the following Math. 4, and outputs the obtained value as a score of the combination. Note that the weight may be set for each predicate that constitutes the combination. Also, the score combining unit 37 may also add up the one-term scores and the two-term scores, respectively, and output the sum thereof as a score of the combination, without using weights.

$$\text{score}_{ij} = \sum_{k=1}^{K} w_k^{(1)} s_k^{(1)} + \sum_{l=1}^{L} w_l^{(2)} s_l^{(2)} \qquad \text{[Math. 4]}$$

[Apparatus Operations]

Next, the operations of the parameter learning apparatus 300 according to the third example embodiment will be described using FIG. 13. FIG. 13 is a flow diagram illustrating operations of the parameter learning apparatus according to the third example embodiment. In the following description, FIG. 12 will be referred to as appropriate. Furthermore, in the third example embodiment, the parameter learning method is implemented by operating the parameter learning apparatus 300. Therefore, the following description of the operations of the parameter learning apparatus 300 applies to the parameter learning method according to the third example embodiment.

Figure 13:
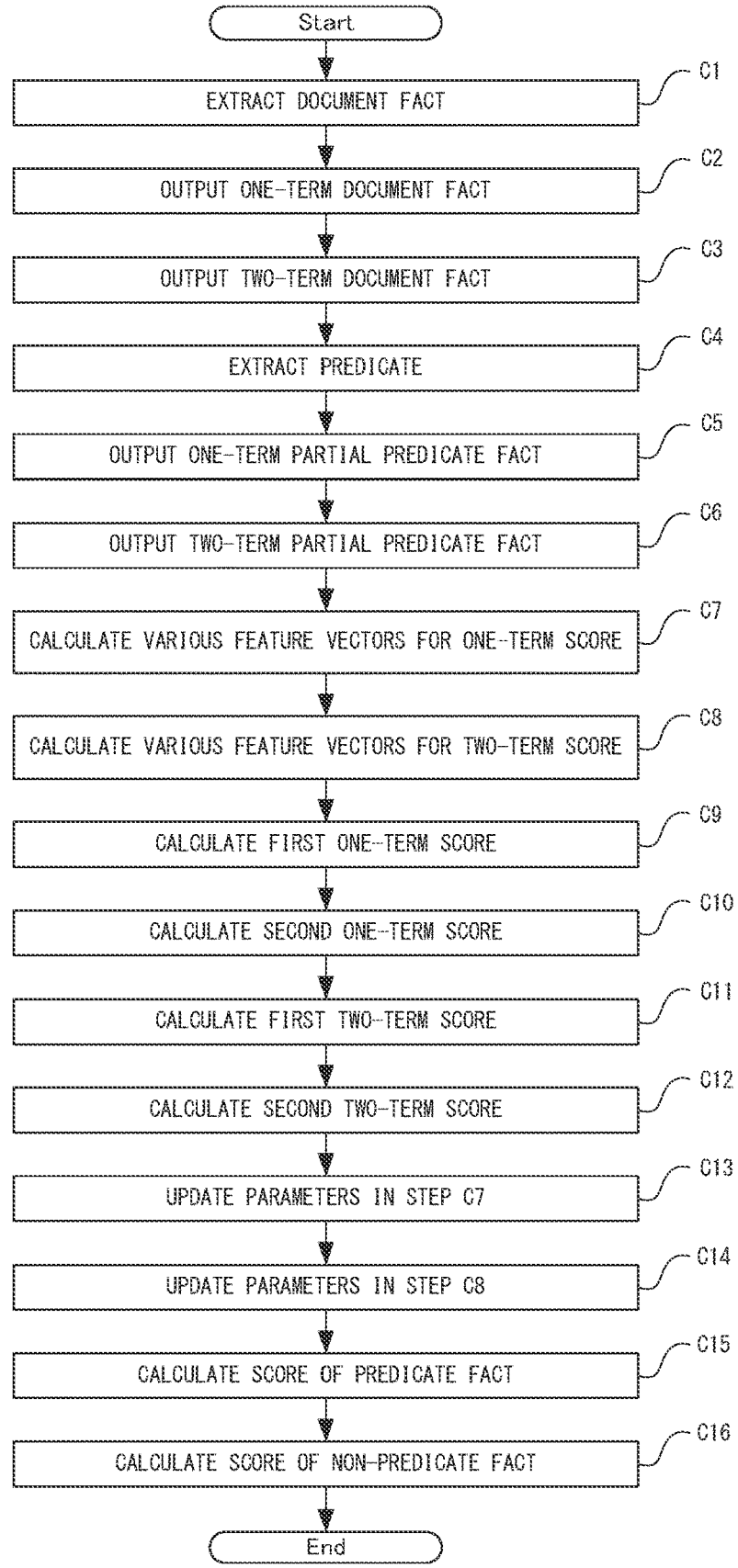
FIG. 13 is a flow diagram illustrating operations of the parameter learning apparatus according to a third example embodiment.

As shown in FIG. 13, first, in the parameter learning apparatus 300, the document fact extracting unit 30 extracts a combination of entities that co-occur with each other in a predetermined range from a document stored in the document storage unit 38, and regards a text representation including this document and appearance position information and the combination of entities as a document fact (step C1).

Next, the document fact extracting unit 30 extracts the entities that constitute the document fact extracted in step C1 one by one, and outputs the combination of the extracted entity and the text representation as a one-term document fact (step C2).

Next, the document fact extracting unit 30 extracts entities that constitute the document fact extracted in step C1 in units of two, and outputs the combination of the extracted entity and the text representation as a two-term document fact (step C3).

Next, the partial predicate fact output unit 31 extracts, by searching the predicate database 101 using a combination of a plurality of entities that co-occur in the predetermined range of the document as a query, a predicate that is related to the combination of entities (step C4). Also, the partial predicate fact output unit 31 regards the combination of the combination of entities and the extracted predicate as a predicate fact.

Next, the partial predicate fact output unit 31 extracts entities that constitute the predicate fact one by one, and outputs a combination of the extracted one entity and a one-term predicate that is defined from the predicate that constitutes the predicate fact as a one-term partial predicate fact (step C5).

Next, the partial predicate fact output unit 31 extracts entities that constitute the predicate fact in units of two, and outputs a combination of the extracted two entities and a two-term predicate that is defined from the predicate that constitutes the predicate fact as a two-term partial predicate fact (step C6).

Next, the one-term vector calculating unit 32 calculates, using a preset table and a neural network, a one-term partial predicate feature vector, a one-term text representation feature vector, and a one-term entity feature vector using a set parameter (step C7).

Next, the two-term vector calculating unit 33 calculates, using a preset table and a neural network, a two-term partial predicate feature vector, a two-term text representation feature vector, and a two-term entity feature vector using a set parameter (step C8).

Next, the one-term score calculating unit 34 calculates, using the one-term partial predicate feature vector, the one-term text representation feature vector, and the one-term entity feature vector, a first one-term score with respect to the one-term document fact and the one-term partial predicate fact (step C9).

Moreover, the one-term score calculating unit 34 calculates the second one-term score, with respect to a combination of one entity and a predicate that is not extracted as the one-term partial predicate fact and a combination of one entity and a text representation that is not extracted as the one-term document fact (step C10).

Next, the two-term score calculating unit 35 calculates a first two-term score with respect to the two-term document fact and the two-term partial predicate fact using the two-term partial predicate feature vector, the two-term text representation feature vector, and the two-term entity feature vector (step C11).

Moreover, the two-term score calculating unit 35 calculates a second two-term score with respect to a combination of a combination of two entities and a predicate that is not extracted as the two-term partial predicate fact and a combination of a combination of two entities and a text representation that is not extracted as the two-term document fact (step C12).

Next, the parameter learning unit 36 updates the parameters to be used in step C7 with use of a gradient method, such that the first one-term score calculated in step C9 is higher than the second one-term score calculated in step C10, specifically, the loss indicated by Math. 2 decreases (step C13).

Subsequently, the parameter learning unit 36 updates the parameters to be used in step C8 with use of a gradient method, such that the first two-term score calculated in step C11 is higher than the second two-term score calculated in step C12, specifically, the loss indicated by Math. 2 decreases (step C14).

Next, the score combining unit 37 calculates, for each predicate fact, a score indicating the degree of establishment of the predicate fact using the first one-term score calculated in step C9, the second one-term score calculated in step C10, the first two-term score calculated in step C11, and the second two-term score calculated in step C12 (step C15).

Moreover, the score combining unit 37 calculates, with respect to a combination of a plurality of entities and a related predicate that is not obtained as the predicate fact, a score indicating the degree of establishment of the combination using the first one-term score calculated in step C9, the second one-term score calculated in step C10, the first two-term score calculated in step C11, and the second two-term score calculated in step C12 (step C16). After execution of step C16, the processing in the parameter learning apparatus 300 is ended.

[Effects of Third Example Embodiment]

As described above, in the third example embodiment, both of the processing performed in the first example embodiment and the processing performed in the second example embodiment are executed. Therefore, according to the third example embodiment, all of the effects described in the first and second example embodiments can be obtained. Also, in the third example embodiment, scores are calculated after the predicate fact and the document fact are broken down into a one-term partial predicate fact, a one-term document fact, a two-term partial predicate fact, and a two-term document fact, and thereafter the scores are combined. Therefore, as a result of using the learning model in which learning of the parameters is performed according to the third example embodiment, the accuracy of extracting the predicate relationship can be greatly improved. Accordingly, in the third example embodiment as well, learning of the parameters for extracting the predicate relationship from a document can be efficiently performed, and therefore the processing speed in a computer that executes the learning can be improved.

[Program]

It is sufficient that the program according to the third example embodiment be a program that causes a computer to execute steps C1 to C16 illustrated in FIG. 13. The parameter learning apparatus 300 and the parameter learning method according to the third example embodiment can be realized by installing this program in the computer and executing this program. In this case, a processor of the computer functions and performs processing as the document fact extracting unit 30, the partial predicate fact output unit 31, the one-term vector calculating unit 32, the two-term vector calculating unit 33, the one-term score calculating unit 34, the two-term score calculating unit 35, the parameter learning unit 36, and the score combining unit 37.

Also, in the third example embodiment, the document storage unit 38 and the parameter storage unit 39 are realized by storing a data file that configures these in a storage device included in the computer, such as a hard disk. Also, the document storage unit 39 and the parameter storage unit 39 may be constructed on a computer different from the computer that executes the program according to the third example embodiment.

Also, the program according to the third example embodiment may be executed by a computer system constructed by a plurality of computers. In this case, for example, each computer may function as one of the document fact extracting unit 30, the partial predicate fact output unit 31, the one-term vector calculating unit 32, the two-term vector calculating unit 33, the one-term score calculating unit 34, the two-term score calculating unit 35, the parameter learning unit 36, and the score combining unit 37.

(Physical Configuration)

Figure 14:
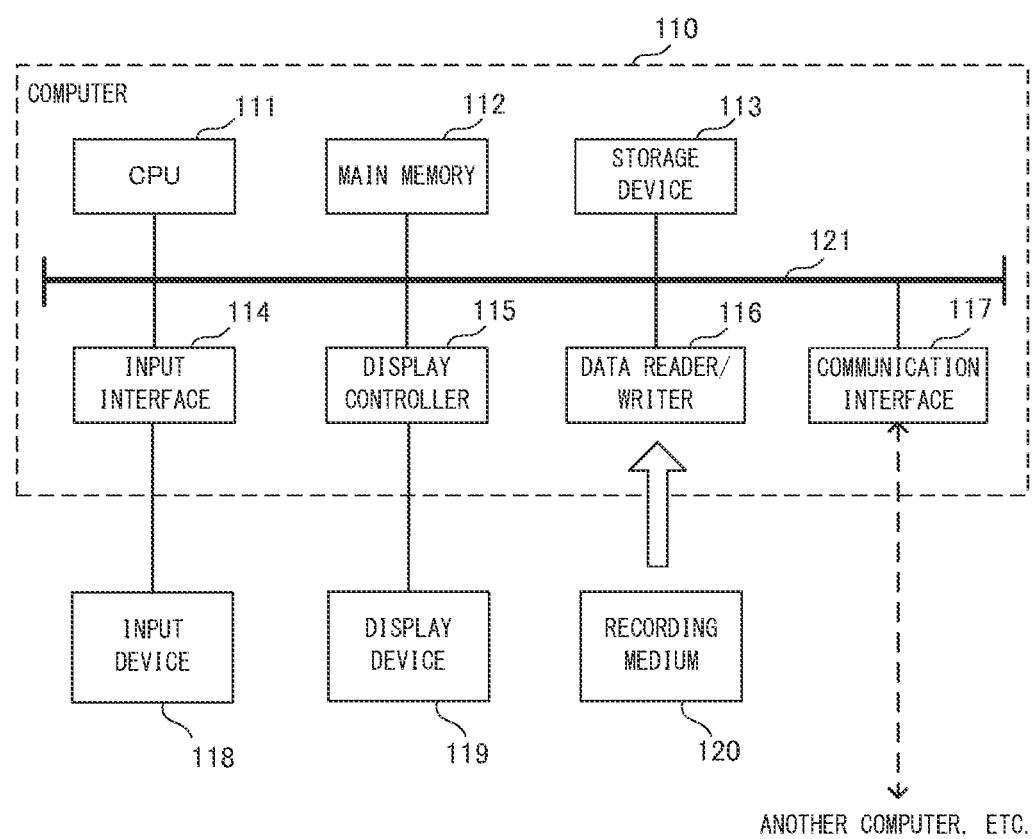
FIG. 14 is a block diagram illustrating an example of a computer that realizes the parameter learning apparatuses according to the first to third example embodiments.

Using FIG. 14, a description is now given of the physical configuration of a computer that realizes the parameter learning apparatus 300 by executing the program according to the first to third example embodiments. FIG. 14 is a block diagram illustrating one example of the computer that realizes the parameter learning apparatus according to the first to third example embodiments.

As illustrated in FIG. 14, a computer 110 includes a CPU (Central Processing Unit) 111, a main memory 112, a storage device 113, an input interface 114, a display controller 115, a data reader/writer 116, and a communication interface 117. These components are connected in such a manner that they can perform data communication with one another via a bus 121. Note that the computer 110 may include a GPU (Graphics Processing Unit) or an FPGA (Field-Programmable Gate Array) in addition to the CPU 111 or in place of the CPU 111.

The CPU 111 carries out various types of computation by deploying the program (codes) according to the present example embodiment stored in the storage device 113 to the main memory 112, and executing the deployed program in a predetermined order. The main memory 112 is typically a volatile storage device, such as a DRAM (Dynamic Random Access Memory). Also, the program according to the present example embodiment is provided in a state where it is stored in a computer readable recording medium 120. Note that the program according to the present example embodiment may also be distributed over the Internet connected via the communication interface 117.

Furthermore, specific examples of the storage device 113 include a hard disk drive, and also a semiconductor storage device, such as a flash memory. The input interface 114 mediates data transmission between the CPU 111 and an input device 118, such as a keyboard and a mouse. The display controller 115 is connected to a display device 119, and controls displays on the display device 119.

The data reader/writer 116 mediates data transmission between the CPU 111 and the recording medium 120, and executes readout of the program from the recording medium 120, as well as writing of the result of processing in the computer 110 to the recording medium 120. The communication interface 117 mediates data transmission between the CPU 111 and another computer.

Also, specific examples of the recording medium 120 include: a general-purpose semiconductor storage device, such as CF (Compact Flash©) and SD (Secure Digital); a magnetic recording medium, such as Flexible Disk; and an optical recording medium, such as CD-ROM (Compact Disk Read Only Memory).

Note that the parameter learning apparatus according to the present example embodiment can also be realized by using items of hardware corresponding to respective components, rather than by using the computer with the program installed therein. Furthermore, a part of the parameter learning apparatus may be realized by the program, and the remaining part of the parameter learning apparatus may be realized by hardware.

A part or all of the aforementioned example embodiment can be described as, but is not limited to, the following (Supplementary note 1) to (Supplementary note 27).

(Supplementary Note 1)

A parameter learning apparatus including:

a document fact extracting unit configured to extract, from a set of entities that are each a string of words, a document in which the entities appear, and information regarding the appearance positions of the entities in the document, a pair of one entity that appears in a predetermined range in the document and a text representation including a string of words that is present in the predetermined range and information indicating the appearance position of the entity in the string of words, as a one-term document fact;

a partial predicate fact output unit configured to obtain a plurality of entities in a predetermined range and a predicate relating to the entities, as a predicate fact, from a database in which entities and related predicates are registered in advance, and output, for each of the plurality of entities that constitute the predicate fact, a one-term predicate that is defined from the predicate that constitutes the predicate fact and the one entity, as a one-term partial predicate fact, using the obtained predicate fact;

a one-term vector calculating unit configured to calculate a one-term partial predicate feature vector that represents a feature of the predicate in the one-term partial predicate fact, a one-term text representation feature vector that represents a feature of the text representation in the one-term document fact, and a one-term entity feature vector that represents a feature of the entity in the one-term partial predicate fact or the one-term document fact, using a set parameter;

a one-term score calculating unit configured to calculate, with respect to the one-term partial predicate fact, a score indicating the degree of establishment of the one-term partial predicate fact, as a first one-term score, using the one-term partial predicate feature vector and the one-term entity feature vector that are calculated from the one-term partial predicate fact, and furthermore, also calculate, with respect to the one-term document fact, a score indicating the degree of establishment of the one-term document fact, as the first one-term score, using the one-term text representation feature vector and the one-term entity feature vector that are calculated from the one-term document fact, and in addition, calculate, with respect to a combination of one entity and a predicate that is not extracted as the one-term partial predicate fact, a score indicating the degree of establishment of the combination, as a second one-term score, and furthermore, also calculate, with respect to a combination of one entity and a text representation that is not extracted as the one-term document fact, a score indicating the degree of establishment of the combination, as the second one-term score;

a parameter learning unit configured to update the parameter to be used in the one-term vector calculating unit with use of a gradient method such that the first one-term score is higher than the second one-term score; and a score combining unit configured to calculate, for each predicate fact, a score indicating the degree of establishment of the predicate fact using the first one-term score and the second one-term score, and calculate, with respect to a combination of a plurality of entities and a predicate related to the entities that is not obtained as the predicate fact, a score indicating the degree of establishment of the combination.

(Supplementary Note 2)

The parameter learning apparatus according to Supplementary note 1, wherein the one-term vector calculating unit calculates one of or both of the one-term entity feature vector and the one-term text representation feature vector using a recurrent neural network that receives a series of real vectors of a predetermined number as an input and outputs other real vectors of the predetermined number.

(Supplementary Note 3)

The parameter learning apparatus according to Supplementary note 1 or 2, wherein
the score combining unit calculates, for each predicate fact, a score indicating the degree of establishment of the predicate fact by respectively multiplying the first one-term score and the second one-term score with weights, and furthermore calculates, with respect to a combination of a plurality of entities and a predicate related the entities that is not obtained as the predicate fact, a score indicating the degree of establishment of the combination.

(Supplementary Note 4)

The parameter learning apparatus according to Supplementary note 1, further including:
a two-term vector calculating unit configured to calculate a two-term score vector; and
a two-term score calculating unit configured to calculate a two-term score,
wherein the document fact extracting unit extracts, from a set of entities that are each a string of words, a document in which the entities appear, and information regarding the appearance positions of the entities in the document, a pair of two entities that appear in a predetermined range in the document and a text representation including a string of words that is present in the predetermined range and information indicating the appearance positions of the two entities in the string of words, as a two-term document fact,
the partial predicate fact output unit outputs, for each combination of two entities selected from the plurality of entities that constitute the predicate fact, a two-term predicate defined from the predicate that constitutes the predicate fact and the combination of two entities, as a two-term partial predicate fact,
the two-term vector calculating unit calculates a two-term partial predicate feature vector that represents a feature of the predicate in the two-term partial predicate fact, a two-term text representation feature vector that represents a feature of the text representation in the two-term document fact, and a two-term entity combination feature vector that represents a feature of a combination of two entities in the two-term partial predicate fact or the two-term document fact using a set parameter,
the two-term score calculating unit calculates, with respect to the two-term partial predicate fact, a score indicating the degree of establishment of the two-term partial predicate fact, as a first two-term score, using the two-term partial predicate feature vector and the two-term entity combination feature vector that are calculated from the two-term partial predicate fact, and furthermore, also calculates, with respect to a two-term document fact, a score indicating the degree of establishment of the two-term document fact, as the first two-term score, using the two-term text representation feature vector and the two-term entity combination feature vector that are calculated from the two-term document fact, and in addition, calculates, with respect to a combination of two entities and a predicate that is not extracted as the two-term partial predicate fact, a score indicating the degree of establishment of the combination, as a second two-term score, and furthermore, also calculates, with respect to a combination of two entities and a text representation that is not extracted as the two-term document fact as well, a score indicating the degree of establishment of the combination, as the second two-term score,
the parameter learning unit further updates the parameter to be used in the two-term vector calculating unit with use of a gradient method such that the first two-term score is higher than the second two-term score, and
the score combining unit calculates, for each predicate fact, a score indicating the degree of establishment of the predicate fact using the first two-term score and the second two-term score in addition to the first one-term score and the second one-term score, and furthermore calculates, with respect to a combination of a plurality of entities and a related predicate that is not obtained as the predicate fact, a score indicating the degree of establishment of the combination.

(Supplementary Note 5)

The parameter learning apparatus according to Supplementary note 4, wherein
the one-term vector calculating unit holds a parameter indicating the one-term partial predicate feature vector and a parameter indicating the one-term entity feature vector, and calculates the one-term text representation feature vector using a recurrent neural network that receives, as an input, a series of real vectors of a predetermined number that represents a text representation, and outputs other real vectors of the predetermined number, and
the two-term vector calculating unit holds a parameter indicating the two-term partial predicate feature vector and a parameter indicating the two-term entity combination feature vector, and calculates the two-term text representation feature vector using the recurrent neural network.

(Supplementary Note 6)

The parameter learning apparatus according to Supplementary note 4 or 5, wherein
the score combining unit calculates, by multiplying the first one-term score, the second one-term score, the first two-term score, and the second two-term score by respective weights, a score indicating the degree of establishment, for each predicate fact, of the predicate fact, and furthermore calculates, with respect to a combination of a plurality of entities and a predicate related to the entities that is not obtained as the predicate fact, a score indicating the degree of establishment of the combination.

(Supplementary Note 7)

A parameter learning apparatus including:
a document fact extracting unit configured to extract, from a set of entities that are each a string of words, a document in which the entities appear, and information regarding the appearance positions of the entities in the document, a pair of two entities that appear in a predetermined range in the document and a text representation including a string of words that is present in the predetermined range and information indicating the appearance positions of the two entities in the string of words, as a two-term document fact;
a partial predicate fact output unit configured to obtain a plurality of entities in a predetermined range and a predicate relating to the entities, as a predicate fact, from a database in which entities and related predicates are registered in advance, and output, for each combination of two entities that are selected from the plurality of entities that constitute the predicate fact, a two-term predicate that is defined from the predicate that constitutes the predicate fact and the combination of two entities, as a two-term partial predicate fact, using the obtained predicate fact;

a two-term vector calculating unit configured to calculate a two-term partial predicate feature vector that represents a feature of the predicate in the two-term partial predicate fact, a two-term text representation feature vector that represents a feature of the text representation in the two-term document fact, and a two-term entity combination feature vector that represents a feature of a combination of two entities in the two-term partial predicate fact or the two-term document fact, using a set parameter;

a two-term score calculating unit configured to calculate, with respect to the two-term partial predicate fact, a score indicating the degree of establishment of the two-term partial predicate fact, as a first two-term score, using the two-term partial predicate feature vector and the two-term entity combination feature vector that are calculated from the two-term partial predicate fact, and furthermore, also calculate, with respect to the two-term document fact, a score indicating the degree of establishment of the two-term document fact, as the first two-term score, using the two-term text representation feature vector and the two-term entity combination feature vector that are calculated from the two-term document fact, and in addition, calculate, with respect to a combination of two entities and a predicate that is not extracted as the two-term partial predicate fact, a score indicating the degree of establishment of the combination, as a second two-term score, and furthermore, also calculate, with respect to a combination of two entities and a text representation that is not extracted as the two-term document fact, a score indicating the degree of establishment of the combination, as the second two-term score;

a parameter learning unit configured to update the parameter to be used in the two-term vector calculating unit with use of a gradient method such that the first two-term score is higher than the second two-term score; and a score combining unit configured to calculate, for each predicate fact, a score indicating the degree of establishment of the predicate fact using the first two-term score and the second two-term score, and calculate, with respect to a combination of a plurality of entities and a predicate related to the entities that is not obtained as the predicate fact, a score indicating the degree of establishment of the combination.

(Supplementary Note 8)

The parameter learning apparatus according to Supplementary note 7, wherein the two-term vector calculating unit holds a parameter indicating the two-term partial predicate feature vector and a parameter indicating the two-term entity combination feature vector, and calculates the two-term text representation feature vector using a recurrent neural network that receives, as an input, a series of real vectors of a predetermined number that represents a text representation and outputs other real vectors of the predetermined number.

(Supplementary Note 9)

The parameter learning apparatus according to Supplementary note 7 or 8, wherein the score combining unit, by multiplying the first two-term score and the second two-term score by respective weights, calculates a score, for each predicate fact, that indicates the degree of establishment of the predicate fact, and furthermore calculates, with respect to a combination of a plurality of entities and a predicate related to the entities that is not obtained as the predicate fact, a score that indicates the degree of establishment of the combination.

(Supplementary Note 10)

A parameter learning method including:

(a) a step of extracting, from a set of entities that are each a string of words, a document in which the entities appear, and information regarding the appearance positions of the entities in the document, a pair of one entity that appears in a predetermined range in the document and a text representation including a string of words that is present in the predetermined range and information indicating the appearance position of the entity in the string of words, as a one-term document fact;

(b) a step of obtaining a plurality of entities in a predetermined range and a predicate relating to the entities, as a predicate fact, from a database in which entities and related predicates are registered in advance, and outputting, for each of the plurality of entities that constitute the predicate fact, a one-term predicate that is defined from the predicate that constitutes the predicate fact and the one entity, as a one-term partial predicate fact, using the obtained predicate fact;

(c) a step of calculating a one-term partial predicate feature vector that represents a feature of the predicate in the one-term partial predicate fact, a one-term text representation feature vector that represents a feature of the text representation in the one-term document fact, and a one-term entity feature vector that represents a feature of the entity in the one-term partial predicate fact or the one-term document fact, using a set parameter;

(d) a step of calculating, with respect to the one-term partial predicate fact, a score indicating the degree of establishment of the one-term partial predicate fact, as a first one-term score, using the one-term partial predicate feature vector and the one-term entity feature vector that are calculated from the one-term partial predicate fact, and furthermore, also calculating, with respect to the one-term document fact, a score indicating the degree of establishment of the one-term document fact, as the first one-term score, using the one-term text representation feature vector and the one-term entity feature vector that are calculated from the one-term document fact, and in addition, calculating, with respect to a combination of one entity and a predicate that is not extracted as the one-term partial predicate fact, a score indicating the degree of establishment of the combination, as a second one-term score, and furthermore, also calculating, with respect to a combination of one entity and a text representation that is not extracted as the one-term document fact, a score indicating the degree of establishment of the combination, as the second one-term score;

(e) a step of updating the parameter to be used in the (c) step, such that the first one-term score is higher than the second one-term score, with use of a gradient method; and (f) a step of calculating, for each predicate fact, a score indicating the degree of establishment of the predicate fact using the first one-term score and the second one-term score, and calculating, with respect to a combination of a plurality of entities and a predicate related to the entities that is not obtained as the predicate fact, a score indicating the degree of establishment of the combination.

(Supplementary Note 11)

The parameter learning method according to Supplementary note 10, wherein in the (c) step, one of or both of the one-term entity feature vector and the one-term text representation feature vector are calculated using a recurrent neural network that receives a series of real vectors of a predetermined number as an input and outputs other real vectors of the predetermined number.

(Supplementary Note 12)

The parameter learning method according to Supplementary note 10 or 11, wherein in the (f) step, for each predicate fact, a score indicating the degree of establishment of the predicate fact is calculated by respectively multiplying the first one-term score and the second one-term score with weights, and furthermore, with respect to a combination of a plurality of entities and a predicate related the entities that is not obtained as the predicate fact, a score indicating the degree of establishment of the combination is calculated.

(Supplementary Note 13)

The parameter learning method according to Supplementary note 10, further including:

(g) a step of calculating a two-term score vector; and (h) a step of calculating a two-term score, wherein, in the (a) step, from a set of entities that are each a string of words, a document in which the entities appear, and information regarding the appearance positions of the entities in the document, a pair is extracted as a two-term document fact, the pair being constituted by two entities that appear in a predetermined range in the document and a text representation including a string of words that is present in the predetermined range and information indicating the appearance positions of the two entities in the string of words, in the (b) step, for each combination of two entities selected from the plurality of entities that constitute the predicate fact, a two-term predicate defined from the predicate that constitutes the predicate fact and the combination of two entities are output, as a two-term partial predicate fact, in the (g) step, a two-term partial predicate feature vector that represents a feature of the predicate in the two-term partial predicate fact, a two-term text representation feature vector that represents a feature of the text representation in the two-term document fact, and a two-term entity combination feature vector that represents a feature of a combination of two entities in the two-term partial predicate fact or the two-term document fact are calculated using a set parameter, in the (h) step, with respect to the two-term partial predicate fact, a score is calculated that indicates the degree of establishment of the two-term partial predicate fact, as a first two-term score, using the two-term partial predicate feature vector and the two-term entity combination feature vector that are calculated from the two-term partial predicate fact, and furthermore, with respect to a two-term document fact, a score is calculated that indicates the degree of establishment of the two-term document fact, as the first two-term score, using the two-term text representation feature vector and the two-term entity combination feature vector that are calculated from the two-term document fact, and in addition, with respect to a combination of two entities and a predicate that is not extracted as the two-term partial predicate fact, a score is calculated that indicates the degree of establishment of the combination, as a second two-term score, and furthermore, with respect to a combination of two entities and a text representation that is not extracted as the two-term document fact as well, a score is calculated that indicates the degree of establishment of the combination, as the second two-term score, in the (e) step, further, the parameter to be used in the (g) step are updated such that the first two-term score is higher than the second two-term score with use of a gradient method, and in the (f) step, calculates, for each predicate fact, a score is calculated that indicates the degree of establishment of the predicate fact using the first two-term score and the second two-term score in addition to the first one-term score and the second one-term score, and furthermore, with respect to a combination of a plurality of entities and a related predicate that is not obtained as the predicate fact, a score is calculated that indicates the degree of establishment of the combination.

(Supplementary Note 14)

The parameter learning method according to Supplementary note 13, wherein in the (c) step, a parameter indicating the one-term partial predicate feature vector and a parameter indicating the one-term entity feature vector are held, and the one-term text representation feature vector is calculated using a recurrent neural network that receives, as an input, a series of real vectors of a predetermined number that represents a text representation, and outputs other real vectors of the predetermined number, and in the (g) step, a parameter indicating the two-term partial predicate feature vector and a parameter indicating the two-term entity combination feature vector are held, and the two-term text representation feature vector is calculated using the recurrent neural network.

(Supplementary Note 15)

The parameter learning method according to Supplementary note 13 or 14, wherein in the (f) step, by multiplying the first one-term score, the second one-term score, the first two-term score, and the second two-term score by respective weights, a score is calculated that indicates the degree of establishment, for each predicate fact, of the predicate fact, and furthermore, with respect to a combination of a plurality of entities and a predicate related to the entities that is not obtained as the predicate fact, a score is calculated that indicates the degree of establishment of the combination.

(Supplementary Note 16)

A parameter learning method including:

(a) a step of extracting, from a set of entities that are each a string of words, a document in which the entities appear, and information regarding the appearance positions of the entities in the document, a pair of two entities that appear in a predetermined range in the document and a text representation including a string of words that is present in the predetermined range and information indicating the appearance positions of the two entities in the string of words, as a two-term document fact;

(b) a step of obtaining a plurality of entities in a predetermined range and a predicate relating to the entities, as a predicate fact, from a database in which entities and related predicates are registered in advance, and outputting, for each combination of two entities that are selected from the plurality of entities that constitute the predicate fact, a two-term predicate that is defined from the predicate that constitutes the predicate fact and the combination of two entities, as a two-term partial predicate fact, using the obtained predicate fact;

(c) a step of calculating a two-term partial predicate feature vector that represents a feature of the predicate in the two-term partial predicate fact, a two-term text representation feature vector that represents a feature of the text representation in the two-term document fact, and a two-term entity combination feature vector that represents a feature of a combination of two entities in the two-term partial predicate fact or the two-term document fact, using a set parameter;

(d) a step of calculating, with respect to the two-term partial predicate fact, a score indicating the degree of establishment of the two-term partial predicate fact, as a first two-term score, using the two-term partial predicate feature vector and the two-term entity combination feature vector that are calculated from the two-term partial predicate fact, and furthermore, also calculating, with respect to the two-term document fact, a score indicating the degree of establishment of the two-term document fact, as the first two-term score, using the two-term text representation feature vector and the two-term entity combination feature vector that are calculated from the two-term document fact, and in addition, calculating, with respect to a combination of two entities and a predicate that is not extracted as the two-term partial predicate fact, a score indicating the degree of establishment of the combination, as a second two-term score, and furthermore, also calculating, with respect to a combination of two entities and a text representation that is not extracted as the two-term document fact, a score indicating the degree of establishment of the combination, as the second two-term score;

(e) a step of updating the parameter to be used in the (c) step such that the first two-term score is higher than the second two-term score, with use of a gradient method; and (f) a step of calculating, for each predicate fact, a score indicating the degree of establishment of the predicate fact using the first two-term score and the second two-term score, and calculating, with respect to a combination of a plurality of entities and a predicate related to the entities that is not obtained as the predicate fact, a score indicating the degree of establishment of the combination.

(Supplementary Note 17)

The parameter learning method according to Supplementary note 16, wherein in the (c) step, a parameter indicating the two-term partial predicate feature vector and a parameter indicating the two-term entity combination feature vector are held, and the two-term text representation feature vector is calculated using a recurrent neural network that receives, as an input, a series of real vectors of a predetermined number that represents a text representation and outputs other real vectors of the predetermined number.

(Supplementary Note 18)

The parameter learning method according to Supplementary note 16 or 17, wherein in the (f) step, by multiplying the first two-term score and the second two-term score by respective weights, a score is calculated, for each predicate fact, that indicates the degree of establishment of the predicate fact, and furthermore, with respect to a combination of a plurality of entities and a predicate related to the entities that is not obtained as the predicate fact, a score is calculated that indicates the degree of establishment of the combination.

(Supplementary Note 19)

A computer readable recording medium that includes a program recorded thereon, the program including instructions that cause a computer to carry out:

(a) a step of extracting, from a set of entities that are each a string of words, a document in which the entities appear, and information regarding the appearance positions of the entities in the document, a pair of one entity that appears in a predetermined range in the document and a text representation including a string of words that is present in the predetermined range and information indicating the appearance position of the entity in the string of words, as a one-term document fact;

(b) a step of obtaining a plurality of entities in a predetermined range and a predicate relating to the entities, as a predicate fact, from a database in which entities and related predicates are registered in advance, and outputting, for each of the plurality of entities that constitute the predicate fact, a one-term predicate that is defined from the predicate that constitutes the predicate fact and the one entity, as a one-term partial predicate fact, using the obtained predicate fact;

(c) a step of calculating a one-term partial predicate feature vector that represents a feature of the predicate in the one-term partial predicate fact, a one-term text representation feature vector that represents a feature of the text representation in the one-term document fact, and a one-term entity feature vector that represents a feature of the entity in the one-term partial predicate fact or the one-term document fact, using a set parameter;

(d) a step of calculating, with respect to the one-term partial predicate fact, a score indicating the degree of establishment of the one-term partial predicate fact, as a first one-term score, using the one-term partial predicate feature vector and the one-term entity feature vector that are calculated from the one-term partial predicate fact, and furthermore, also calculating, with respect to the one-term document fact, a score indicating the degree of establishment of the one-term document fact, as the first one-term score, using the one-term text representation feature vector and the one-term entity feature vector that are calculated from the one-term document fact, and in addition, calculating, with respect to a combination of one entity and a predicate that is not extracted as the one-term partial predicate fact, a score indicating the degree of establishment of the combination, as a second one-term score, and furthermore, also calculating, with respect to a combination of one entity and a text representation that is not extracted as the one-term document fact, a score indicating the degree of establishment of the combination, as the second one-term score;

(e) a step of updating the parameter to be used in the (c) step, such that the first one-term score is higher than the second one-term score, with use of a gradient method; and (f) a step of calculating, for each predicate fact, a score indicating the degree of establishment of the predicate fact using the first one-term score and the second one-term score, and calculating, with respect to a combination of a plurality of entities and a predicate related to the entities that is not obtained as the predicate fact, a score indicating the degree of establishment of the combination.

(Supplementary Note 20)

The computer readable recording medium according to Supplementary note 19, wherein in the (c) step, one of or both of the one-term entity feature vector and the one-term text representation feature vector are calculated using a recurrent neural network that receives a series of real vectors of a predetermined number as an input and outputs other real vectors of the predetermined number.

(Supplementary Note 21)

The computer readable recording medium according to Supplementary note 19 or 20, wherein in the (f) step, for each predicate fact, a score indicating the degree of establishment of the predicate fact is calculated by respectively multiplying the first one-term score and the second one-term score with weights, and furthermore, with respect to a combination of a plurality of entities and a predicate related the entities that is not obtained as the predicate fact, a score indicating the degree of establishment of the combination is calculated.

(Supplementary Note 22)

The computer readable recording medium that includes the program according to supplementary note 19 recorded thereon, the program further including instructions that causes the computer to carry out:

(g) a step of calculating a two-term score vector; and (h) a step of calculating a two-term score, wherein, in the (a) step, from a set of entities that are each a string of words, a document in which the entities appear, and information regarding the appearance positions of the entities in the document, a pair is extracted as a two-term document fact, the pair being constituted by two entities that appear in a predetermined range in the document and a text representation including a string of words that is present in the predetermined range and information indicating the appearance positions of the two entities in the string of words, in the (b) step, for each combination of two entities selected from the plurality of entities that constitute the predicate fact, a two-term predicate defined from the predicate that constitutes the predicate fact and the combination of two entities are output, as a two-term partial predicate fact, in the (g) step, a two-term partial predicate feature vector that represents a feature of the predicate in the two-term partial predicate fact, a two-term text representation feature vector that represents a feature of the text representation in the two-term document fact, and a two-term entity combination feature vector that represents a feature of a combination of two entities in the two-term partial predicate fact or the two-term document fact are calculated using a set parameter, in the (h) step, with respect to the two-term partial predicate fact, a score is calculated that indicates the degree of establishment of the two-term partial predicate fact, as a first two-term score, using the two-term partial predicate feature vector and the two-term entity combination feature vector that are calculated from the two-term partial predicate fact, and furthermore, with respect to a two-term document fact, a score is calculated that indicates the degree of establishment of the two-term document fact, as the first two-term score, using the two-term text representation feature vector and the two-term entity combination feature vector that are calculated from the two-term document fact, and in addition, with respect to a combination of two entities and a predicate that is not extracted as the two-term partial predicate fact, a score is calculated that indicates the degree of establishment of the combination, as a second two-term score, and furthermore, with respect to a combination of two entities and a text representation that is not extracted as the two-term document fact as well, a score is calculated that indicates the degree of establishment of the combination, as the second two-term score, in the (e) step, further, the parameter to be used in the (g) step are updated such that the first two-term score is higher than the second two-term score with use of a gradient method, and in the (f) step, calculates, for each predicate fact, a score is calculated that indicates the degree of establishment of the predicate fact using the first two-term score and the second two-term score in addition to the first one-term score and the second one-term score, and furthermore, with respect to a combination of a plurality of entities and a related predicate that is not obtained as the predicate fact, a score is calculated that indicates the degree of establishment of the combination.

(Supplementary Note 23)

The computer readable recording medium according to Supplementary note 22, wherein in the (c) step, a parameter indicating the one-term partial predicate feature vector and a parameter indicating the one-term entity feature vector are held, and the one-term text representation feature vector is calculated using a recurrent neural network that receives, as an input, a series of real vectors of a predetermined number that represents a text representation, and outputs other real vectors of the predetermined number, and in the (g) step, a parameter indicating the two-term partial predicate feature vector and a parameter indicating the two-term entity combination feature vector are held, and the two-term text representation feature vector is calculated using the recurrent neural network.

(Supplementary Note 24)

The computer readable recording medium according to Supplementary note 22 or 23, wherein in the (f) step, by multiplying the first one-term score, the second one-term score, the first two-term score, and the second two-term score by respective weights, a score is calculated that indicates the degree of establishment, for each predicate fact, of the predicate fact, and furthermore, with respect to a combination of a plurality of entities and a predicate related to the entities that is not obtained as the predicate fact, a score is calculated that indicates the degree of establishment of the combination.

(Supplementary Note 25)

A computer readable recording medium that includes a program recorded thereon, the program including instructions that cause a computer to carry out:

(a) a step of extracting, from a set of entities that are each a string of words, a document in which the entities appear, and information regarding the appearance positions of the entities in the document, a pair of two entities that appear in a predetermined range in the document and a text representation including a string of words that is present in the predetermined range and information indicating the appearance positions of the two entities in the string of words, as a two-term document fact;

(b) a step of obtaining a plurality of entities in a predetermined range and a predicate relating to the entities, as a predicate fact, from a database in which entities and related predicates are registered in advance, and outputting, for each combination of two entities that are selected from the plurality of entities that constitute the predicate fact, a two-term predicate that is defined from the predicate that constitutes the predicate fact and the combination of two entities, as a two-term partial predicate fact, using the obtained predicate fact;

(c) a step of calculating a two-term partial predicate feature vector that represents a feature of the predicate in the two-term partial predicate fact, a two-term text representation feature vector that represents a feature of the text representation in the two-term document fact, and a two-term entity combination feature vector that represents a feature of a combination of two entities in the two-term partial predicate fact or the two-term document fact, using a set parameter;

(d) a step of calculating, with respect to the two-term partial predicate fact, a score indicating the degree of establishment of the two-term partial predicate fact, as a first two-term score, using the two-term partial predicate feature vector and the two-term entity combination feature vector that are calculated from the two-term partial predicate fact, and furthermore, also calculating, with respect to the two-term document fact, a score indicating the degree of establishment of the two-term document fact, as the first two-term score, using the two-term text representation feature vector and the two-term entity combination feature vector that are calculated from the two-term document fact, and in addition, calculating, with respect to a combination of two entities and a predicate that is not extracted as the two-term partial predicate fact, a score indicating the degree of establishment of the combination, as a second two-term score, and furthermore, also calculating, with respect to a combination of two entities and a text representation that is not extracted as the two-term document fact, a score indicating the degree of establishment of the combination, as the second two-term score;

(e) a step of updating the parameter to be used in the (c) step such that the first two-term score is higher than the second two-term score, with use of a gradient method; and (f) a step of calculating, for each predicate fact, a score indicating the degree of establishment of the predicate fact using the first two-term score and the second two-term score, and calculating, with respect to a combination of a plurality of entities and a predicate related to the entities that is not obtained as the predicate fact, a score indicating the degree of establishment of the combination.

(Supplementary Note 26)

The computer readable recording medium according to Supplementary note 25, wherein in the (c) step, a parameter indicating the two-term partial predicate feature vector and a parameter indicating the two-term entity combination feature vector are held, and the two-term text representation feature vector is calculated using a recurrent neural network that receives, as an input, a series of real vectors of a predetermined number that represents a text representation and outputs other real vectors of the predetermined number.

(Supplementary Note 27)

The computer readable recording medium according to Supplementary note 25 or 26, wherein in the (f) step, by multiplying the first two-term score and the second two-term score by respective weights, a score is calculated, for each predicate fact, that indicates the degree of establishment of the predicate fact, and furthermore, with respect to a combination of a plurality of entities and a predicate related to the entities that is not obtained as the predicate fact, a score is calculated that indicates the degree of establishment of the combination.

While the invention of the present application has been described above with reference to the example embodiment, the invention of the present application is not limited to the aforementioned example embodiment. Various changes that can be understood by a person skilled in the art within the scope of the invention of the present application can be made to the configurations and details of the invention of the present application.

INDUSTRIAL APPLICABILITY

As described above, according to the present invention, a text representation with no label appended thereto can also be used as learning data in the extraction of a predicate relationship from a document, and in addition, parameters for the extraction can be learned so that the performance is not influenced by the number of arguments of a predicate to be output. The present invention is useful in various fields in which the extraction of a predicate relationship from a document is required, for example, in abduction inference.

REFERENCE SIGNS LIST

100 Parameter learning apparatus (first example embodiment)
10 Document fact extracting unit
11 Partial predicate fact output unit
12 One-term vector calculating unit
13 One-term score calculating unit
14 Parameter learning unit
15 Score combining unit
16 Document storage unit
17 Parameter storage unit
200 Parameter learning apparatus (second example embodiment)
20 Document fact extracting unit
21 Partial predicate fact output unit
22 Two-term vector calculating unit
23 Two-term score calculating unit
24 Parameter learning unit
25 Score combining unit
300 Parameter learning apparatus (third example embodiment)
30 Document fact extracting unit
31 Partial predicate fact output unit
32 One-term vector calculating unit
33 Two-term vector calculating unit
34 One-term score calculating unit
35 Two-term score calculating unit
36 Parameter learning unit
37 Score combining unit
38 Document storage unit
39 Parameter storage unit
101 Predicate database
110 Computer
111 CPU
112 Main memory
113 Storage device
114 Input interface
115 Display controller
116 Data reader/writer 117 Communication interface
118 Input device
119 Display device
120 Recording medium
121 Bus

What is claimed is:

1. A parameter learning apparatus comprising:
at least one memory storing instructions; and
at least one processor configured to execute the instructions to:
extract, from a set of entities that are each a string of words, a document in which the entities appear;
extract information regarding appearance positions of the entities in the document;
extract a pair of one entity that appears in a predetermined range in the document and a text representation including a string of words that is present in the predetermined range, and information indicating the appearance position of the one entity in the string of words included in the text representation, as a one-term document fact;
obtain, as a predicate fact, a plurality of entities in a predetermined range and a predicate relating to the entities, from a database in which entities and related predicates are registered in advance;
output, for each of the plurality of entities that constitute the predicate fact, a one-term predicate that is defined from the predicate that constitutes the predicate fact and the one entity, as a one-term partial predicate fact, using the predicate fact;
calculate a one-term partial predicate feature vector that represents a feature of the predicate in the one-term partial predicate fact, a one-term text representation feature vector that represents a feature of the text representation in the one-term document fact, and a one-term entity feature vector that represents a feature of one of the plurality of entities in the one-term partial predicate fact or the one entity in the one-term document fact, using a set parameter;
calculate, as a first one-term score with respect to the one-term partial predicate fact, a score indicating a degree of establishment of the one-term partial predicate fact, using the one-term partial predicate feature vector and the one-term entity feature vector;
calculate, as the first one-term score with respect to the one-term document fact, a score indicating a degree of establishment of the one-term document fact, using the one-term text representation feature vector and the one-term entity feature vector;
calculate, as a second one-term score with respect to a combination of the one entity and a predicate that is not extracted as the one-term partial predicate fact, a score indicating a degree of establishment of the combination;
calculate, as the second one-term score with respect to a combination of one entity and a text representation that is not extracted as the one-term document fact, a score indicating a degree of establishment of the combination;
update the parameter by using a gradient method, such that the first one-term score is higher than the second one-term score;
calculate and output a score indicating a degree of establishment of the predicate fact using the first one-term score and the second one-term score as to the one-term partial predicate fact, using the updated parameter; and
calculate and output a score indicating a degree of establishment of a combination of the plurality of entities and a predicate related to the entities that is not obtained as the predicate fact, using the updated parameter.

2. The parameter learning apparatus according to claim 1, wherein the at least one processor is configured to execute the instructions to:
calculate one of or both of the one-term entity feature vector and the one-term text representation feature vector using a recurrent neural network that receives a series of real vectors of a predetermined number as an input and outputs other real vectors of the predetermined number.

3. The parameter learning apparatus according to claim 1, wherein the at least one processor is configured to execute the instructions to:
calculate, for the predicate fact, a score indicating a degree of establishment of the predicate fact by multiplying the first one-term score and the second one-term score with respective weights; and
calculate, with respect to a combination of the plurality of entities and a predicate related the entities that is not obtained as the predicate fact, a score indicating a degree of establishment of the combination.

4. The parameter learning apparatus according to claim 1, wherein the at least one processor is configured to execute the instructions to:
calculate a two-term score vector;
calculate a two-term score;
extract, from the set of entities, a second document in which the entities appear;
extract information regarding appearance positions of the entities in the second document;
extract, as a two-term document fact, a pair of two entities that appear in the predetermined range in the document and a text representation including a string of words that is present in the predetermined range, and information indicating the appearance positions of the two entities in the string of words included in the text representation;
output, as a two-term partial predicate fact and for a combination of two entities selected from the plurality of entities that constitute the predicate fact, a two-term predicate defined from the predicate that constitutes the predicate fact and the combination of two entities;
calculate a two-term partial predicate feature vector that represents a feature of the predicate in the two-term partial predicate fact, a two-term text representation feature vector that represents a feature of the text representation in the two-term document fact, and a two-term entity combination feature vector that represents a feature of the combination of two entities in the two-term partial predicate fact or the pair of two entities in the two-term document fact, using the set parameter;
calculate, as a first two-term score with respect to the two-term partial predicate fact, a score indicating a degree of establishment of the two-term partial predicate fact, using the two-term partial predicate feature vector and the two-term entity combination feature vector;
calculate, as the first two-term score with respect to a two-term document fact, a score indicating a degree of establishment of the two-term document fact, using the two-term text representation feature vector and the two-term entity combination feature vector;

calculate, as a second two-term score with respect to a combination of the pair of two entities and a predicate that is not extracted as the two-term partial predicate fact, a score indicating a degree of establishment of the combination;

calculate, as the second two-term score with respect to a combination of the pair of two entities and a text representation that is not extracted as the two-term document fact, a score indicating a degree of establishment of the combination;

update the parameter by using the gradient method, such that the first two-term score is higher than the second two-term score;

calculate and output, a score indicating the degree of establishment of the predicate fact using the first two-term score and the second two-term score in addition to the first one-term score and the second one-term score and calculate and output a score indicating the degree of establishment of the combination of the plurality of entities and the predicate related to the entities that is not obtained as the predicate fact, using the updated parameter.

5. The parameter learning apparatus according to claim 4, wherein at least one processor configured to execute the instructions to:

specify a parameter indicating the one-term partial predicate feature vector and a parameter indicating the one-term entity feature vector;

calculate the one-term text representation feature vector using a recurrent neural network that receives a series of real vectors of a predetermined number that represents a text representation as an input and outputs other real vectors of the predetermined number;

specify a parameter indicating the two-term partial predicate feature vector and a parameter indicating the two-term entity combination feature vector; and calculate the two-term text representation feature vector using the recurrent neural network.

6. The parameter learning apparatus according to claim 4, wherein at least one processor configured to execute the instructions to:

calculate, for the predicate fact, a score indicating a degree of establishment of the predicated fact by multiplying the first one-term score, the second one-term score, the first two-term score, and the second two-term score by with respective weights; and calculate, with respect to the combination of a plurality of entities and a predicate related to the entities that is not obtained as the predicate fact, a score indicating a degree of establishment of the combination.

7. A parameter learning method performed by a computer and comprising:

extracting, from a set of entities that are each a string of words, a document in which the entities appear;

extracting information regarding appearance positions of the entities in the document;

extracting a pair of one entity that appears in a predetermined range in the document and a text representation including a string of words that is present in the predetermined range, and information indicating the appearance position of the one entity in the string of words included in the text representation, as a one-term document fact;

obtaining, as a predicate fact, a plurality of entities in a predetermined range and a predicate relating to the entities, from a database in which entities and related predicates are registered in advance;

outputting, for each of the plurality of entities that constitute the predicate fact, a one-term predicate that is defined from the predicate that constitutes the predicate fact and the one entity, as a one-term partial predicate fact, using the predicate fact;

calculating a one-term partial predicate feature vector that represents a feature of the predicate in the one-term partial predicate fact, a one-term text representation feature vector that represents a feature of the text representation in the one-term document fact, and a one-term entity feature vector that represents a feature of one of the plurality of entities in the one-term partial predicate fact or the one entity in the one-term document fact, using a set parameter;

calculating, as a first one-term score with respect to the one-term partial predicate fact, a score indicating a degree of establishment of the one-term partial predicate fact, using the one-term partial predicate feature vector and the one-term entity feature vector;

calculating, as the first one-term score with respect to the one-term document fact, a score indicating a degree of establishment of the one-term document fact, using the one-term text representation feature vector and the one-term entity feature vector;

calculating, as a second one-term score with respect to a combination of the one entity and a predicate that is not extracted as the one-term partial predicate fact, a score indicating a degree of establishment of the combination;

calculating, as the second one-term score with respect to a combination of one entity and a text representation that is not extracted as the one-term document fact, a score indicating a degree of establishment of the combination;

updating the parameter by using a gradient method, such that the first one-term score is higher than the second one-term score;

calculating and outputting a score indicating a degree of establishment of the predicate fact using the first one-term score and the second one-term score as to the one-term partial predicate fact, using the updated parameter; and calculating and outputting a score indicating a degree of establishment of a combination of the plurality of entities and a predicate related to the entities that is not obtained as the predicate fact, using the updated parameter.

8. The parameter learning method according to claim 7, further comprising:

calculating one of or both of the one-term entity feature vector and the one-term text representation feature vector using a recurrent neural network that receives a series of real vectors of a predetermined number as an input and outputs other real vectors of the predetermined number.

9. The parameter learning method according to claim 7, further comprising:

calculating, for the predicate fact, a score indicating a degree of establishment of the predicate fact by multiplying the first one-term score and the second one-term score with respective weights; and calculating, with respect to a combination of the plurality of entities and a predicate related the entities that is not obtained as the predicate fact, a score indicating a degree of establishment of the combination.

10. The parameter learning method according to claim 7, further comprising:

calculating a two-term score vector;

calculating a two-term score;

extracting, from the set of entities, a second document in which the entities appear;

extracting information regarding appearance positions of the entities in the second document;

extracting, as a two-term document fact, a pair of two entities that appear in the predetermined range in the document and a text representation including a string of words that is present in the predetermined range, and information indicating the appearance positions of the two entities in the string of words included in the text representation;

outputting, as a two-term partial predicate fact and for a combination of two entities selected from the plurality of entities that constitute the predicate fact, a two-term predicate defined from the predicate that constitutes the predicate fact and the combination of two entities; calculate a two-term partial predicate feature vector that represents a feature of the predicate in the two-term partial predicate fact, a two-term text representation feature vector that represents a feature of the text representation in the two-term document fact, and a two-term entity combination feature vector that represents a feature of the combination of two entities in the two-term partial predicate fact or the pair of two entities in the two-term document fact, using the set parameter;

calculating, as a first two-term score with respect to the two-term partial predicate fact, a score indicating a degree of establishment of the two-term partial predicate fact, using the two-term partial predicate feature vector and the two-term entity combination feature vector;

calculating, as the first two-term score with respect to a two-term document fact, a score indicating a degree of establishment of the two-term document fact, using the two-term text representation feature vector and the two-term entity combination feature vector;

calculating, as a second two-term score with respect to a combination of the pair of two entities and a predicate that is not extracted as the two-term partial predicate fact, a score indicating a degree of establishment of the combination;

calculating, as the second two-term score with respect to a combination of the pair of two entities and a text representation that is not extracted as the two-term document fact, a score indicating a degree of establishment of the combination;

updating the parameter by using the gradient method, such that the first two-term score is higher than the second two-term score;

calculating and outputting a score indicating the degree of establishment of the predicate fact using the first two-term score and the second two-term score in addition to the first one-term score and the second one-term score and calculate and output a score indicating the degree of establishment of the combination of the plurality of entities and the predicate related to the entities that is not obtained as the predicate fact, using the updated parameter.

11. The parameter learning method according to claim 10, further comprising:

specifying a parameter indicating the one-term partial predicate feature vector and a parameter indicating the one-term entity feature vector;

calculating the one-term text representation feature vector using a recurrent neural network that receives a series of real vectors of a predetermined number that represents a text representation as an input and outputs other real vectors of the predetermined number;

specifying a parameter indicating the two-term partial predicate feature vector and a parameter indicating the two-term entity combination feature vector; and calculating the two-term text representation feature vector using the recurrent neural network.

12. The parameter learning method according to claim 10, further comprising:

calculating, for the predicate fact, a score indicating a degree of establishment of the predicated fact by multiplying the first one-term score, the second one-term score, the first two-term score, and the second two-term score by with respective weights; and calculating, with respect to the combination of a plurality of entities and a predicate related to the entities that is not obtained as the predicate fact, a score indicating a degree of establishment of the combination.

13. A non-transitory computer readable recording medium storing instructions that cause a computer to perform processing comprising:

extracting, from a set of entities that are each a string of words, a document in which the entities appear;

extracting information regarding appearance positions of the entities in the document;

extracting a pair of one entity that appears in a predetermined range in the document and a text representation including a string of words that is present in the predetermined range, and information indicating the appearance position of the one entity in the string of words included in the text representation, as a one-term document fact;

obtaining, as a predicate fact, a plurality of entities in a predetermined range and a predicate relating to the entities, from a database in which entities and related predicates are registered in advance;

outputting, for each of the plurality of entities that constitute the predicate fact, a one-term predicate that is defined from the predicate that constitutes the predicate fact and the one entity, as a one-term partial predicate fact, using the predicate fact;

calculating a one-term partial predicate feature vector that represents a feature of the predicate in the one-term partial predicate fact, a one-term text representation feature vector that represents a feature of the text representation in the one-term document fact, and a one-term entity feature vector that represents a feature of one of the plurality of entities in the one-term partial predicate fact or the one entity in the one-term document fact, using a set parameter;

calculating, as a first one-term score with respect to the one-term partial predicate fact, a score indicating a degree of establishment of the one-term partial predicate fact, using the one-term partial predicate feature vector and the one-term entity feature vector;

calculating, as the first one-term score with respect to the one-term document fact, a score indicating a degree of establishment of the one-term document fact, using the one-term text representation feature vector and the one-term entity feature vector;

calculating, as a second one-term score with respect to a combination of the one entity and a predicate that is not extracted as the one-term partial predicate fact, a score indicating a degree of establishment of the combination;

calculating, as the second one-term score with respect to a combination of one entity and a text representation that is not extracted as the one-term document fact, a score indicating a degree of establishment of the combination;

updating the parameter by using a gradient method, such that the first one-term score is higher than the second one-term score;

calculating and outputting a score indicating a degree of establishment of the predicate fact using the first one-term score and the second one-term score as to the one-term partial predicate fact, using the updated parameter; and calculating and outputting a score indicating a degree of establishment of a combination of the plurality of entities and a predicate related to the entities that is not obtained as the predicate fact, using the updated parameter.

14. The non-transitory computer readable recording medium according to claim 13, wherein the processing further comprises:

calculating one of or both of the one-term entity feature vector and the one-term text representation feature vector using a recurrent neural network that receives a series of real vectors of a predetermined number as an input and outputs other real vectors of the predetermined number.

15. The non-transitory computer readable recording medium according to claim 13, wherein the processing further comprises:

calculating, for the predicate fact, a score indicating a degree of establishment of the predicate fact by multiplying the first one-term score and the second one-term score with respective weights; and calculating, with respect to a combination of the plurality of entities and a predicate related the entities that is not obtained as the predicate fact, a score indicating a degree of establishment of the combination.

16. The non-transitory computer readable recording medium according to claim 13, wherein the processing further comprises:

calculating a two-term score vector;

calculating a two-term score;

extracting, from the set of entities, a second document in which the entities appear;

extracting information regarding appearance positions of the entities in the second document;

extracting, as a two-term document fact, a pair of two entities that appear in the predetermined range in the document and a text representation including a string of words that is present in the predetermined range, and information indicating the appearance positions of the two entities in the string of words included in the text representation;

outputting, as a two-term partial predicate fact and for a combination of two entities selected from the plurality of entities that constitute the predicate fact, a two-term predicate defined from the predicate that constitutes the predicate fact and the combination of two entities; calculate a two-term partial predicate feature vector that represents a feature of the predicate in the two-term partial predicate fact, a two-term text representation feature vector that represents a feature of the text representation in the two-term document fact, and a two-term entity combination feature vector that represents a feature of the combination of two entities in the two-term partial predicate fact or the pair of two entities in the two-term document fact, using the set parameter;

calculating, as a first two-term score with respect to the two-term partial predicate fact, a score indicating a degree of establishment of the two-term partial predicate fact, using the two-term partial predicate feature vector and the two-term entity combination feature vector;

calculating, as the first two-term score with respect to a two-term document fact, a score indicating a degree of establishment of the two-term document fact, using the two-term text representation feature vector and the two-term entity combination feature vector;

calculating, as a second two-term score with respect to a combination of the pair of two entities and a predicate that is not extracted as the two-term partial predicate fact, a score indicating a degree of establishment of the combination;

calculating, as the second two-term score with respect to a combination of the pair of two entities and a text representation that is not extracted as the two-term document fact, a score indicating a degree of establishment of the combination;

updating the parameter by using the gradient method, such that the first two-term score is higher than the second two-term score;

calculating and outputting a score indicating the degree of establishment of the predicate fact using the first two-term score and the second two-term score in addition to the first one-term score and the second one-term score and calculate and output a score indicating the degree of establishment of the combination of the plurality of entities and the predicate related to the entities that is not obtained as the predicate fact, using the updated parameter.

17. The non-transitory computer readable recording medium according to claim 16, wherein the processing further comprises:

specifying a parameter indicating the one-term partial predicate feature vector and a parameter indicating the one-term entity feature vector;

calculating the one-term text representation feature vector using a recurrent neural network that receives a series of real vectors of a predetermined number that represents a text representation as an input and outputs other real vectors of the predetermined number;

specifying a parameter indicating the two-term partial predicate feature vector and a parameter indicating the two-term entity combination feature vector; and calculating the two-term text representation feature vector using the recurrent neural network.

18. The non-transitory computer readable recording medium according to claim 16, wherein the processing further comprises:

calculating, for the predicate fact, a score indicating a degree of establishment of the predicated fact by multiplying the first one-term score, the second one-term score, the first two-term score, and the second two-term score by with respective weights; and calculating, with respect to the combination of a plurality of entities and a predicate related to the entities that is not obtained as the predicate fact, a score indicating a degree of establishment of the combination.

\* \* \* \* \*